(12) United States Patent
Nefulda et al.

(10) Patent No.: US 11,416,136 B2
(45) Date of Patent: Aug. 16, 2022

(54) USER INTERFACES FOR ASSIGNING AND RESPONDING TO USER INPUTS

(71) Applicant: Apple Inc., Cupertino, CA (US)

(72) Inventors: John M. Nefulda, Toronto (CA); Keith P. Avery, Seattle, WA (US); Madhu Chinthakunta, Saratoga, CA (US); Christopher B. Fleizach, Gilroy, CA (US); Varun Maudgalya, Sunnyvale, CA (US); Sommer E. Panage, San Mateo, CA (US); Xinyi Yan, Ontario (CA); Garrett L. Weinberg, Santa Cruz, CA (US); Michal K. Wegrzynski, Seattle, WA (US); William Caruso, Saratoga, CA (US); Kenneth S. Friedman, Berkeley, CA (US); Jamil Dhanani, San Francisco, CA (US); Muhammad Amir Shafiq, Seattle, WA (US); Minwoo Jeong, Sammamish, WA (US); Timothy S. Paek, Mercer Island, WA (US); Viet Huy Le, Seattle, WA (US); Heriberto Nieto, Seattle, WA (US); Brandt M. Westing, Seattle, WA (US); Rishabh Yadav, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/167,896

(22) Filed: Feb. 4, 2021

(65) Prior Publication Data

US 2022/0083211 A1 Mar. 17, 2022

Related U.S. Application Data

(60) Provisional application No. 63/078,125, filed on Sep. 14, 2020.

(51) Int. Cl.
*G06F 3/048* (2013.01)
*G06F 3/04847* (2022.01)
(Continued)

(52) U.S. Cl.
CPC .......... *G06F 3/04847* (2013.01); *G06F 3/016* (2013.01); *G06F 3/0482* (2013.01); *H04M 1/72466* (2021.01); *H04M 2201/42* (2013.01)

(58) Field of Classification Search
CPC ..... G06F 3/0482; G06F 3/04847; G06F 3/016
See application file for complete search history.

(56) References Cited

U.S. PATENT DOCUMENTS 6,073,036 A 6/2000 Heikkinen et al.
6,094,197 A 7/2000 Buxton et al.
(Continued)

FOREIGN PATENT DOCUMENTS

CN 101198925 A 6/2008
JP 2000-155638 A 6/2000
(Continued)

OTHER PUBLICATIONS

Notice of Allowance received for U.S. Appl. No. 16/245,140, dated Jul. 30, 2021, 8 pages.
(Continued)

*Primary Examiner* — Claudia Dragoescu
(74) *Attorney, Agent, or Firm* — Dentons US LLP

(57) ABSTRACT

The present disclosure generally relates to assigning tasks to various user inputs, and detecting and responding to user inputs. In some embodiments, the present disclosure relates to assigning tasks to various user inputs received on a back surface of a device, and detecting and responding to user inputs on the back surface of the device.

24 Claims, 32 Drawing Sheets

(51) Int. Cl.
*H04M 1/72466* (2021.01)
*G06F 3/0482* (2013.01)
*G06F 3/01* (2006.01)

(56) References Cited

U.S. PATENT DOCUMENTS

| | | | |
|---|---|---|---|
| 6,377,965 B1 | 4/2002 | Hachamovitch et al. |
| 6,401,060 B1 | 6/2002 | Critchlow et al. |
| 6,426,761 B1 | 7/2002 | Kanevsky et al. |
| 6,801,659 B1 | 10/2004 | O'dell |
| 6,856,318 B1 | 2/2005 | Lewak |
| 7,283,126 B2 | 10/2007 | Leung |
| 7,458,014 B1 | 11/2008 | Rubin et al. |
| 7,487,147 B2 | 2/2009 | Bates et al. |
| 7,502,017 B1 | 3/2009 | Ratzlaff et al. |
| 7,650,562 B2 | 1/2010 | Bederson et al. |
| 7,676,763 B2 | 3/2010 | Rummel et al. |
| 7,941,762 B1 | 5/2011 | Tovino et al. |
| 8,112,529 B2 | 2/2012 | Van et al. |
| 8,136,052 B2 | 3/2012 | Shin et al. |
| 8,232,973 B2 | 7/2012 | Kocienda et al. |
| 8,245,156 B2 | 8/2012 | Mouilleseaux et al. |
| 8,286,085 B1 | 10/2012 | Denise |
| 8,299,943 B2 | 10/2012 | Longe et al. |
| 8,423,916 B2 | 4/2013 | Chihara et al. |
| 8,601,389 B2 | 12/2013 | Schulz et al. |
| 8,645,825 B1 | 2/2014 | Cornea et al. |
| 8,671,343 B2 | 3/2014 | Oberstein |
| 8,706,750 B2 | 4/2014 | Hansson et al. |
| 8,825,484 B2 | 9/2014 | Yamada et al. |
| 8,843,845 B2 | 9/2014 | Bi et al. |
| 8,896,556 B2 | 11/2014 | Frazier et al. |
| 8,972,903 B2 | 3/2015 | James et al. |
| 9,007,311 B2 | 4/2015 | Kwak et al. |
| 9,021,380 B2 | 4/2015 | Ouyang et al. |
| 9,046,928 B2 | 6/2015 | Kumhyr |
| 9,058,092 B2 | 6/2015 | Rogers |
| 9,116,551 B2 | 8/2015 | Huang et al. |
| 9,250,797 B2 | 2/2016 | Roberts et al. |
| 9,310,889 B2 | 4/2016 | Griffin et al. |
| 9,436,380 B2 | 9/2016 | Chmielewski et al. |
| 9,535,597 B2 | 1/2017 | Wong et al. |
| 9,557,913 B2 | 1/2017 | Griffin et al. |
| 9,557,916 B2 | 1/2017 | Robinson et al. |
| 10,037,139 B2 | 7/2018 | Pasquero et al. |
| 2001/0015718 A1 | 8/2001 | Hinckley et al. |
| 2002/0126148 A1 | 9/2002 | Rosenkranz et al. |
| 2003/0041147 A1 | 2/2003 | Van et al. |
| 2003/0159113 A1 | 8/2003 | Bederson et al. |
| 2003/0229607 A1 | 12/2003 | Zellweger et al. |
| 2004/0055446 A1 | 3/2004 | Robbin et al. |
| 2004/0095395 A1 | 5/2004 | Kurtenbach |
| 2004/0140956 A1 | 7/2004 | Kushler et al. |
| 2004/0160419 A1 | 8/2004 | Padgitt |
| 2005/0114324 A1 | 5/2005 | Mayer |
| 2005/0169527 A1 | 8/2005 | Longe et al. |
| 2006/0241944 A1 | 10/2006 | Potter et al. |
| 2006/0274051 A1 | 12/2006 | Longe et al. |
| 2007/0046641 A1 | 3/2007 | Lim |
| 2007/0061753 A1 | 3/2007 | Ng et al. |
| 2007/0143262 A1 | 6/2007 | Kasperski |
| 2007/0156747 A1 | 7/2007 | Samuelson et al. |
| 2007/0174387 A1 | 7/2007 | Jania et al. |
| 2007/0180392 A1 | 8/2007 | Russo |
| 2008/0036743 A1 | 2/2008 | Westerman et al. |
| 2008/0109401 A1 | 5/2008 | Sareen et al. |
| 2008/0168349 A1 | 7/2008 | Lamiraux et al. |
| 2008/0174570 A1* | 7/2008 | Jobs ............... G06F 3/0488 345/173 |
| 2008/0177717 A1 | 7/2008 | Kumar et al. |
| 2008/0209358 A1 | 8/2008 | Yamashita |
| 2008/0266261 A1 | 10/2008 | Idzik et al. |
| 2008/0310723 A1 | 12/2008 | Manu et al. |
| 2008/0316183 A1 | 12/2008 | Westerman et al. |
| 2009/0007017 A1 | 1/2009 | Anzures et al. |
| 2009/0058823 A1 | 3/2009 | Kocienda |
| 2009/0064055 A1 | 3/2009 | Chaudhri et al. |
| 2009/0119289 A1 | 5/2009 | Gibbs et al. |
| 2009/0172532 A1 | 7/2009 | Chaudhri |
| 2009/0193332 A1 | 7/2009 | Lee |
| 2009/0199130 A1 | 8/2009 | Tsern et al. |
| 2009/0278806 A1 | 11/2009 | Duarte et al. |
| 2009/0319172 A1 | 12/2009 | Almeida et al. |
| 2010/0287486 A1 | 11/2010 | Coddington et al. |
| 2010/0333030 A1 | 12/2010 | Johns |
| 2011/0004849 A1 | 1/2011 | Oh |
| 2011/0041102 A1* | 2/2011 | Kim ............... G06F 3/0488 715/863 |
| 2011/0183720 A1 | 7/2011 | Dinn |
| 2011/0201387 A1 | 8/2011 | Paek et al. |
| 2011/0202876 A1 | 8/2011 | Badger et al. |
| 2011/0209098 A1 | 8/2011 | Hinckley et al. |
| 2012/0036469 A1 | 2/2012 | Suraqui |
| 2012/0047135 A1 | 2/2012 | Hansson et al. |
| 2012/0119997 A1 | 5/2012 | Gutowitz et al. |
| 2012/0167009 A1 | 6/2012 | Davidson et al. |
| 2012/0239395 A1 | 9/2012 | Foo et al. |
| 2012/0240036 A1 | 9/2012 | Howard et al. |
| 2012/0242603 A1* | 9/2012 | Engelhardt ......... G06F 3/0383 345/173 |
| 2013/0002553 A1 | 1/2013 | Colley et al. |
| 2013/0036387 A1 | 2/2013 | Murata |
| 2013/0104068 A1 | 4/2013 | Murphy et al. |
| 2013/0125037 A1 | 5/2013 | Pasquero et al. |
| 2013/0187858 A1 | 7/2013 | Griffin et al. |
| 2013/0285927 A1 | 10/2013 | Pasquero et al. |
| 2013/0339283 A1 | 12/2013 | Grieves et al. |
| 2014/0002363 A1 | 1/2014 | Griffin et al. |
| 2014/0028571 A1 | 1/2014 | St. et al. |
| 2014/0063067 A1 | 3/2014 | Compton et al. |
| 2014/0085311 A1 | 3/2014 | Gay et al. |
| 2014/0176776 A1 | 6/2014 | Morita |
| 2014/0195979 A1 | 7/2014 | Branton et al. |
| 2014/0310639 A1 | 10/2014 | Zhai et al. |
| 2014/0317547 A1 | 10/2014 | Bi et al. |
| 2015/0121285 A1 | 4/2015 | Eleftheriou et al. |
| 2015/0142602 A1 | 5/2015 | Williams et al. |
| 2015/0281788 A1 | 10/2015 | Noguerol et al. |
| 2015/0331605 A1 | 11/2015 | Park et al. |
| 2015/0347007 A1 | 12/2015 | Jong et al. |
| 2015/0347379 A1 | 12/2015 | Jong et al. |
| 2015/0378982 A1 | 12/2015 | Mckenzie et al. |
| 2016/0070441 A1 | 3/2016 | Paek et al. |
| 2016/0357304 A1* | 12/2016 | Hatori ............. G06F 3/04883 |
| 2019/0147035 A1 | 5/2019 | Chaudhri et al. |

FOREIGN PATENT DOCUMENTS

| | | |
|---|---|---|
| JP | 2007-172767 A | 7/2007 |
| JP | 2007-187708 A | 7/2007 |
| WO | 2006/020305 A2 | 2/2006 |

OTHER PUBLICATIONS

Notice of Allowance received for U.S. Appl. No. 16/245,140, dated May 18, 2021, 14 pages.
Applicant-initiated Interview Summary received for U.S. Appl. No. 16/245,140, dated Apr. 2, 2021, 4 pages.
Applicant-Initiated Interview Summary received for U.S. Appl. No. 16/245,140, dated Feb. 1, 2021, 4 pages.
Anonymous, "Swipe to Edit Using BetterTouchTool: Mac Automation Tips", Mac Automation Tips, XP55217837, retrieved from the Internet: URL: https://macautomationtips.wordpress.com/2011/03/11/swipe-to-edit-using-bettertouchtool/, Mar. 11, 2011, 1 page.
Applicant-Initiated Interview Summary received for U.S. Appl. No. 16/245,140, dated Sep. 16, 2020, 6 pages.
Chavda Prekesh, "Swipe to Edit", Dribbble, XP55217832, Retrieved from the Internet: URL: https://dribbble.comjshots/1320750-Swipe-to-Edit-animation, Nov. 21, 2013, 7 Pages.
Decision to Grant received for European Patent Application No. 15716372.6, dated Aug. 16, 2019, 2 pages.

(56) References Cited

OTHER PUBLICATIONS

Decision to Refuse received for European Patent Application No. 11733962.2, dated Sep. 30, 2016, 20 Pages.
Final Office Action Received for U.S. Appl. No. 14/502,711, dated Sep. 22, 2017, 27 pages.
Final Office Action received for U.S. Appl. No. 12/832,900, dated Nov. 9, 2012, 13 pages.
Final Office Action received for U.S. Appl. No. 14/502,711, dated Apr. 12, 2017, 29 pages.
Final Office Action Received for U.S. Appl. No. 14/503,147, dated Jun. 15, 2017, 18 Pages.
Final Office Action received for U.S. Appl. No. 16/245,140, dated Feb. 11, 2021, 23 pages.
Intention to Grant received for European Patent Application No. 15716372.6, dated Apr. 3, 2019, 7 pages.
International Preliminary Report on Patentability Received for PCT Application No. PCT/US2015/023946, dated Dec. 15, 2016, 17 pages.
International Preliminary Report on Patentability received for PCT Patent Application No. PCT/US2011/043302, dated Jan. 17, 2013, 8 pages.
International Search Report and Written Opinion Received for PCT Application No. PCT/US2015/023946, dated Oct. 12, 2015, 22 pages.
International Search Report and Written Opinion received for PCT Patent Application No. PCT/US2011/043302, dated Dec. 15, 2011, 10 pages.
Minutes of the oral proceedings received for European Patent Application No. 15716372.6, dated Mar. 29, 2019, 9 pages.
Minutes of the Oral Proceedings received for European Patent Application No. 15716372.6, dated Feb. 21, 2019, 6 pages.
Non-Final Office Action received for U.S. Appl. No. 14/502,711, dated Apr. 26, 2018, 21 pages.
Non-Final Office Action Received for U.S. Appl. No. 14/503,147, dated Nov. 2, 2016, 21 pages.
Non-Final Office Action Received for U.S. Appl. No. 14/502,711, dated Nov. 21, 2016, 23 pages.
Non-Final Office Action received for U.S. Appl. No. 12/832,900, dated Aug. 29, 2013, 11 pages.
Non-Final Office Action received for U.S. Appl. No. 12/832,900, dated Jul. 20, 2012, 16 pages.
Non-Final Office Action received for U.S. Appl. No. 12/832,900, dated Mar. 17, 2014, 12 pages.
Non-Final Office Action received for U.S. Appl. No. 16/245,140, dated Jun. 2, 2020, 23 pages.
Non-Final Office Action received for U.S. Appl. No. 16/245,140, dated Oct. 30, 2020, 20 pages.
Notice of Acceptance received for Australian Patent Application No. 2011274519, dated Jul. 8, 2015, 2 pages.
Notice of Allowance received for Japanese Patent Application No. 2013-518852, dated Nov. 17, 2014, 3 pages (Official Copy only) (See Communication under 37 CFR § 1.98(a) (3)).
Notice of Allowance received for Korean Patent Application No. 10-2013-7003037, dated Jul. 14, 2015, 3 pages (1 page of English Translation and 2 pages of Official Copy).
Notice of Allowance received for U.S. Appl. No. 12/832,900, dated Dec. 4, 2014, 2 pages.
Notice of Allowance received for U.S. Appl. No. 12/832,900, dated Jan. 17, 2014, 7 pages.
Notice of Allowance received for U.S. Appl. No. 12/832,900, dated Oct. 24, 2014, 10 pages.
Notice of Allowance received for U.S. Appl. No. 14/502,711, dated Sep. 28, 2018, 9 pages.
Notice of Allowance received for U.S. Appl. No. 14/503,147, dated Jan. 28, 2019, 7 pages.
Notice of Allowance received for U.S. Appl. No. 14/503,147, dated Sep. 12, 2018, 7 pages.
Notice to Grant received for Chinese Patent Application No. 201180039041.6, dated Dec. 27, 2016, 4 pages (2 pages of English Translation and 2 pages Official Copy).
Office Action received for Australian Patent Application No. 2011274519, dated Jan. 13, 2015, 3 pages.
Office Action received for Australian Patent Application No. 2011274519, dated May 12, 2015, 3 pages.
Office Action received for Australian Patent Application No. 2011274519, dated Oct. 17, 2013, 3 pages.
Office Action received for Chinese Patent Application No. 201180039041.6, dated Aug. 5, 2016, 4 pages (1 pages of English Translation and 3 pages of Official Copy).
Office Action received for Chinese Patent Application No. 201180039041.6, dated Jan. 18, 2016, 20 pages (10 pages of English Translation and 10 pages of Official copy).
Office Action received for Chinese Patent Application No. 201180039041.6, dated Mar. 2, 2015, 18 pages (10 pages of English Translation and 8 pages of Official copy).
Office Action received for European Patent Application No. 11733962.2 dated Dec. 9, 2015, 7 pages.
Office Action received for European Patent Application No. 11733962.2, dated Jan. 22, 2014, 4 pages.
Office Action received for European Patent Application No. 15716372.6, dated Nov. 15, 2017, 8 pages.
Office Action received for Japanese Patent Application No. 2013-518852, dated Feb. 10, 2014, 3 pages (Official Copy only) (See Communication under 37 CFR § 1.98(a) (3)).
Office Action received for Korean Patent Application No. 10-2013-7003037, dated Jan. 22, 2014, 4 pages (Official Copy only) (See Communication under 37 CFR § 1.98(a) (3)).
Office Action received for Korean Patent Application No. 10-2013-7003037, dated Oct. 23, 2014, 7 pages (3 pages of English Translation and 4 pages of Official Copy).
Summons to Attend Oral Proceeding received for European Patent Application No. 11733962.2, dated Apr. 13, 2016, 8 pages.
Summons to Attend Oral Proceedings received for European Patent Application No. 15716372.6, dated Jul. 13, 2018, 9 pages.

\* cited by examiner

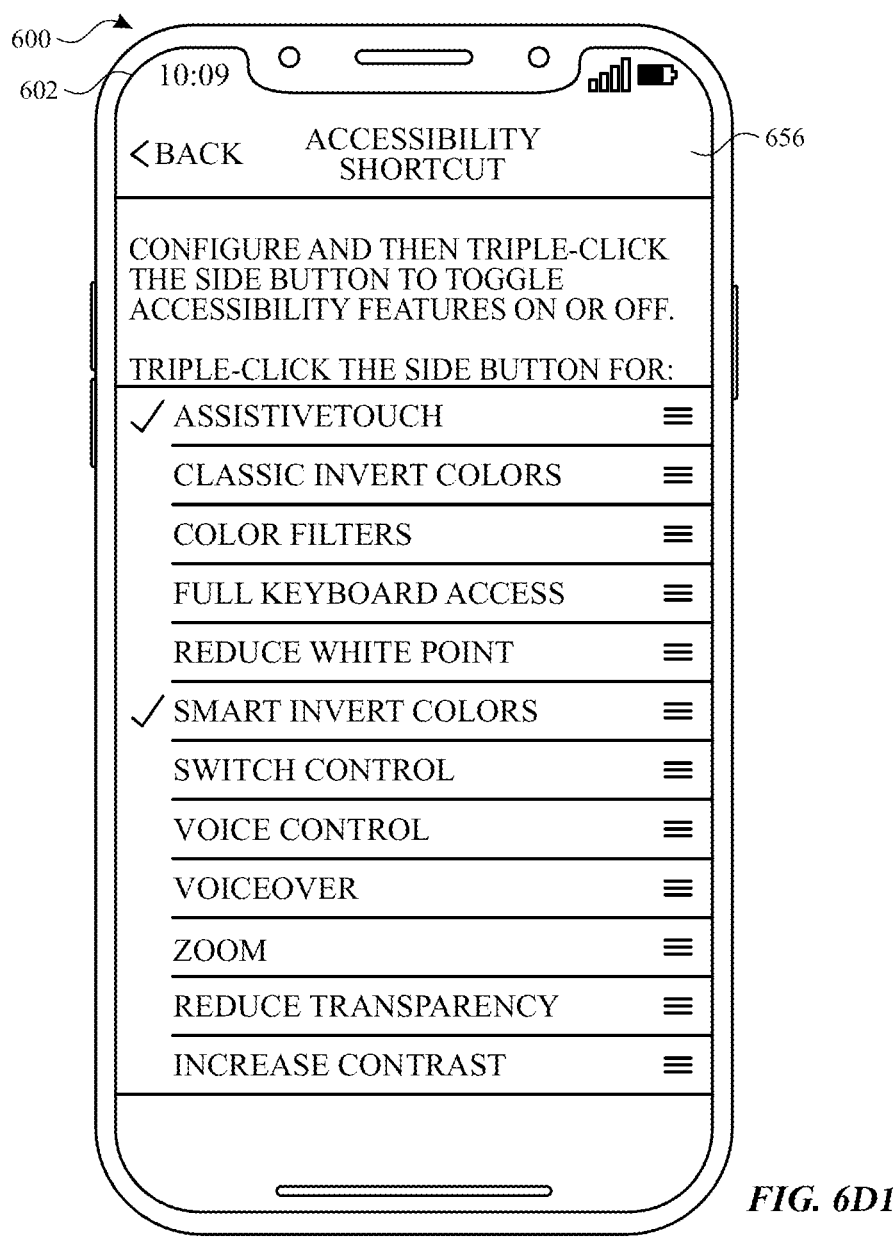
FIG. 6D1

USER INTERFACES FOR ASSIGNING AND RESPONDING TO USER INPUTS

CROSS-REFERENCE TO RELATED APPLICATION

This application claims the benefit of U.S. Provisional Patent Application No. 63/078,125, entitled "USER INTERFACES FOR ASSIGNING AND RESPONDING TO USER INPUTS," filed Sep. 14, 2020, the contents of which is hereby incorporated by reference in its entirety.

FIELD

The present disclosure relates generally to computer user interfaces, and more specifically to techniques for assigning and responding to user inputs.

BACKGROUND

As electronic devices, such as smartphones have become more widely used, their functions have grown beyond phone calls and text messaging. Accessing the various functions on these electronic devices can be complex and time-consuming or require consuming screen real estate to display user interface elements for all of the various functions.

BRIEF SUMMARY

Some techniques for assigning tasks to and responding to user inputs using electronic devices, however, are generally cumbersome and inefficient. For example, some existing techniques use a complex and time-consuming user interface, which may include multiple key presses or keystrokes. In addition, some existing techniques require the display of numerous selectable user interface objects for functions, which can consume screen real estate or limit access to those functions, when the selectable user interface objects are not displayed. Existing techniques require more time than necessary, wasting user time and device energy. This latter consideration is particularly important in battery-operated devices.

Accordingly, the present technique provides electronic devices with faster, more efficient methods and interfaces for assigning and responding to user inputs. Such methods and interfaces optionally complement or replace other methods for assigning and responding to user inputs. Such methods and interfaces reduce the cognitive burden on a user and produce a more efficient human-machine interface. For battery-operated computing devices, such methods and interfaces conserve power and increase the time between battery charges.

Furthermore, providing efficient user interfaces for assigning and responding to user inputs allows users to customize user inputs such that unnecessary, extraneous, and/or repetitive user inputs can be avoided, and fewer user inputs can be used to perform certain tasks. Such methods and interfaces reduce the cognitive burden on a user and produce a more efficient human-machine interface. For battery-operated computing devices, such methods and interfaces conserve power and increase the time between battery charges.

In some embodiments, a method comprises: at a computer system that is in communication with a display generation component and one or more input devices, wherein the computer system includes a housing having a back surface: displaying, via the display generation component, a first plurality of action options for a double tap input on the back surface of the housing, wherein the double tap input is a double tap input that satisfies a first set of input criteria; while displaying the first plurality of action options for the double tap input on the back surface of the housing, receiving, via the one or more input devices, a first set of one or more inputs that includes selection of a first action option of the first plurality of action options, wherein the first action option is associated with a first action; in response to receiving the first set of one or more inputs, configuring the computer system to perform the first action on detection of the double tap input on the back surface of the housing; displaying, via the display generation component, a second plurality of action options for an alternative double tap input on the back surface of the housing, wherein the alternative double tap input is a double tap input that satisfies a second set of input criteria different from the first set of input criteria; while displaying the second plurality of action options for the alternative double tap input on the back surface of the housing, receiving, via the one or more input devices, a second set of one or more inputs that includes selection of a second action option of the second plurality of action options, wherein the second action option is associated with a second action different from the first action; in response to receiving the second set of one or more inputs, configuring the computer system to perform the second action on detection of the alternative double tap input on the back surface of the housing; displaying, via the display generation component, a third plurality of action options for a triple tap input on the back surface of the housing, wherein the triple tap input is a triple tap input that satisfies a third set of input criteria; while displaying the third plurality of action options for the triple tap input on the back surface of the housing, receiving, via the one or more input devices, a third set of one or more inputs that includes selection of a third action option of the third plurality of action options, wherein the third action option is associated with a third action different from the first action and the second action; in response to receiving the third set of one or more inputs, configuring the computer system to perform the third action on detection of the triple tap input on the back surface of the housing; displaying, via the display generation component, a fourth plurality of action options for an alternative triple tap input on the back surface of the housing, wherein the alternative triple tap input is a triple tap input that satisfies a fourth set of input criteria different from the third set of input criteria; while displaying the fourth plurality of action options for the alternative triple tap input on the back surface of the housing, receiving, via the one or more input devices, a fourth set of one or more inputs that includes selection of a fourth action option of the fourth plurality of action options, wherein the fourth action option is associated with a fourth action; in response to receiving the fourth set of one or more inputs, configuring the computer system to perform the fourth action on detection of the alternative triple tap input on the back surface of the housing; after receiving the first set of one or more inputs, the second set of one or more inputs, the third set of one or more inputs, and the fourth set of one or more inputs, detecting, via the one or more input devices, a user input; and in response to detecting the user input: in accordance with a determination that the user input is a double tap input on the back surface of the housing, performing the first action; in accordance with a determination that the user input is the alternative double tap input on the back surface of the housing, performing the second action; in accordance with a determination that the user input is a triple tap input on the back surface of the housing, performing the third action; and in accordance with a determination that the user input is the alternative triple tap input on the back surface of the housing, performing the fourth action.

In some embodiments, a non-transitory computer-readable storage medium stores one or more programs configured to be executed by one or more processors of a computer system that is in communication with a display generation component and one or more input devices, wherein the computer system includes a housing having a back surface, the one or more programs including instructions for: displaying, via the display generation component, a first plurality of action options for a double tap input on the back surface of the housing, wherein the double tap input is a double tap input that satisfies a first set of input criteria; while displaying the first plurality of action options for the double tap input on the back surface of the housing, receiving, via the one or more input devices, a first set of one or more inputs that includes selection of a first action option of the first plurality of action options, wherein the first action option is associated with a first action; in response to receiving the first set of one or more inputs, configuring the computer system to perform the first action on detection of the double tap input on the back surface of the housing; displaying, via the display generation component, a second plurality of action options for an alternative double tap input on the back surface of the housing, wherein the alternative double tap input is a double tap input that satisfies a second set of input criteria different from the first set of input criteria; while displaying the second plurality of action options for the alternative double tap input on the back surface of the housing, receiving, via the one or more input devices, a second set of one or more inputs that includes selection of a second action option of the second plurality of action options, wherein the second action option is associated with a second action different from the first action; in response to receiving the second set of one or more inputs, configuring the computer system to perform the second action on detection of the alternative double tap input on the back surface of the housing; displaying, via the display generation component, a third plurality of action options for a triple tap input on the back surface of the housing, wherein the triple tap input is a triple tap input that satisfies a third set of input criteria; while displaying the third plurality of action options for the triple tap input on the back surface of the housing, receiving, via the one or more input devices, a third set of one or more inputs that includes selection of a third action option of the third plurality of action options, wherein the third action option is associated with a third action different from the first action and the second action; in response to receiving the third set of one or more inputs, configuring the computer system to perform the third action on detection of the triple tap input on the back surface of the housing; displaying, via the display generation component, a fourth plurality of action options for an alternative triple tap input on the back surface of the housing, wherein the alternative triple tap input is a triple tap input that satisfies a fourth set of input criteria different from the third set of input criteria; while displaying the fourth plurality of action options for the alternative triple tap input on the back surface of the housing, receiving, via the one or more input devices, a fourth set of one or more inputs that includes selection of a fourth action option of the fourth plurality of action options, wherein the fourth action option is associated with a fourth action; in response to receiving the fourth set of one or more inputs, configuring the computer system to perform the fourth action on detection of the alternative triple tap input on the back surface of the housing; after receiving the first set of one or more inputs, the second set of one or more inputs, the third set of one or more inputs, and the fourth set of one or more inputs, detecting, via the one or more input devices, a user input; and in response to detecting the user input: in accordance with a determination that the user input is a double tap input on the back surface of the housing, performing the first action; in accordance with a determination that the user input is the alternative double tap input on the back surface of the housing, performing the second action; in accordance with a determination that the user input is a triple tap input on the back surface of the housing, performing the third action; and in accordance with a determination that the user input is the alternative triple tap input on the back surface of the housing, performing the fourth action.

In some embodiments, a transitory computer-readable storage medium stores one or more programs configured to be executed by one or more processors of a computer system that is in communication with a display generation component and one or more input devices, wherein the computer system includes a housing having a back surface, the one or more programs including instructions for: displaying, via the display generation component, a first plurality of action options for a double tap input on the back surface of the housing, wherein the double tap input is a double tap input that satisfies a first set of input criteria; while displaying the first plurality of action options for the double tap input on the back surface of the housing, receiving, via the one or more input devices, a first set of one or more inputs that includes selection of a first action option of the first plurality of action options, wherein the first action option is associated with a first action; in response to receiving the first set of one or more inputs, configuring the computer system to perform the first action on detection of the double tap input on the back surface of the housing; displaying, via the display generation component, a second plurality of action options for an alternative double tap input on the back surface of the housing, wherein the alternative double tap input is a double tap input that satisfies a second set of input criteria different from the first set of input criteria; while displaying the second plurality of action options for the alternative double tap input on the back surface of the housing, receiving, via the one or more input devices, a second set of one or more inputs that includes selection of a second action option of the second plurality of action options, wherein the second action option is associated with a second action different from the first action; in response to receiving the second set of one or more inputs, configuring the computer system to perform the second action on detection of the alternative double tap input on the back surface of the housing; displaying, via the display generation component, a third plurality of action options for a triple tap input on the back surface of the housing, wherein the triple tap input is a triple tap input that satisfies a third set of input criteria; while displaying the third plurality of action options for the triple tap input on the back surface of the housing, receiving, via the one or more input devices, a third set of one or more inputs that includes selection of a third action option of the third plurality of action options, wherein the third action option is associated with a third action different from the first action and the second action; in response to receiving the third set of one or more inputs, configuring the computer system to perform the third action on detection of the triple tap input on the back surface of the housing; displaying, via the display generation component, a fourth plurality of action options for an alternative triple tap input on the back surface of the housing, wherein the alternative triple tap input is a triple tap input that satisfies a fourth set of input criteria different from the third set of input criteria; while displaying the fourth plurality of action options for the alternative triple tap input on the back surface of the housing, receiving, via the one or more input devices, a fourth set of one or more inputs that includes selection of a fourth action option of the fourth plurality of action options, wherein the fourth action option is associated with a fourth action; in response to receiving the fourth set of one or more inputs, configuring the computer system to perform the fourth action on detection of the alternative triple tap input on the back surface of the housing; after receiving the first set of one or more inputs, the second set of one or more inputs, the third set of one or more inputs, and the fourth set of one or more inputs, detecting, via the one or more input devices, a user input; and in response to detecting the user input: in accordance with a determination that the user input is a double tap input on the back surface of the housing, performing the first action; in accordance with a determination that the user input is the alternative double tap input on the back surface of the housing, performing the second action; in accordance with a determination that the user input is a triple tap input on the back surface of the housing, performing the third action; and in accordance with a determination that the user input is the alternative triple tap input on the back surface of the housing, performing the fourth action.

In some embodiments, a computer system comprises: a housing having a back surface; a display generation component; one or more input devices; one or more processors; and memory storing one or more programs configured to be executed by the one or more processors, the one or more programs including instructions for: displaying, via the display generation component, a first plurality of action options for a double tap input on the back surface of the housing, wherein the double tap input is a double tap input that satisfies a first set of input criteria; while displaying the first plurality of action options for the double tap input on the back surface of the housing, receiving, via the one or more input devices, a first set of one or more inputs that includes selection of a first action option of the first plurality of action options, wherein the first action option is associated with a first action; in response to receiving the first set of one or more inputs, configuring the computer system to perform the first action on detection of the double tap input on the back surface of the housing; displaying, via the display generation component, a second plurality of action options for an alternative double tap input on the back surface of the housing, wherein the alternative double tap input is a double tap input that satisfies a second set of input criteria different from the first set of input criteria; while displaying the second plurality of action options for the alternative double tap input on the back surface of the housing, receiving, via the one or more input devices, a second set of one or more inputs that includes selection of a second action option of the second plurality of action options, wherein the second action option is associated with a second action different from the first action; in response to receiving the second set of one or more inputs, configuring the computer system to perform the second action on detection of the alternative double tap input on the back surface of the housing; displaying, via the display generation component, a third plurality of action options for a triple tap input on the back surface of the housing, wherein the triple tap input is a triple tap input that satisfies a third set of input criteria; while displaying the third plurality of action options for the triple tap input on the back surface of the housing, receiving, via the one or more input devices, a third set of one or more inputs that includes selection of a third action option of the third plurality of action options, wherein the third action option is associated with a third action different from the first action and the second action; in response to receiving the third set of one or more inputs, configuring the computer system to perform the third action on detection of the triple tap input on the back surface of the housing; displaying, via the display generation component, a fourth plurality of action options for an alternative triple tap input on the back surface of the housing, wherein the alternative triple tap input is a triple tap input that satisfies a fourth set of input criteria different from the third set of input criteria; while displaying the fourth plurality of action options for the alternative triple tap input on the back surface of the housing, receiving, via the one or more input devices, a fourth set of one or more inputs that includes selection of a fourth action option of the fourth plurality of action options, wherein the fourth action option is associated with a fourth action; in response to receiving the fourth set of one or more inputs, configuring the computer system to perform the fourth action on detection of the alternative triple tap input on the back surface of the housing; after receiving the first set of one or more inputs, the second set of one or more inputs, the third set of one or more inputs, and the fourth set of one or more inputs, detecting, via the one or more input devices, a user input; and in response to detecting the user input: in accordance with a determination that the user input is a double tap input on the back surface of the housing, performing the first action; in accordance with a determination that the user input is the alternative double tap input on the back surface of the housing, performing the second action; in accordance with a determination that the user input is a triple tap input on the back surface of the housing, performing the third action; and in accordance with a determination that the user input is the alternative triple tap input on the back surface of the housing, performing the fourth action.

In some embodiments, a computer system, comprises: a housing having a back surface; a display generation component; one or more input devices; means for displaying, via the display generation component, a first plurality of action options for a double tap input on the back surface of the housing, wherein the double tap input is a double tap input that satisfies a first set of input criteria; means for, while displaying the first plurality of action options for the double tap input on the back surface of the housing, receiving, via the one or more input devices, a first set of one or more inputs that includes selection of a first action option of the first plurality of action options, wherein the first action option is associated with a first action; means for, in response to receiving the first set of one or more inputs, configuring the computer system to perform the first action on detection of the double tap input on the back surface of the housing; means for displaying, via the display generation component, a second plurality of action options for an alternative double tap input on the back surface of the housing, wherein the alternative double tap input is a double tap input that satisfies a second set of input criteria different from the first set of input criteria; means for, while displaying the second plurality of action options for the alternative double tap input on the back surface of the housing, receiving, via the one or more input devices, a second set of one or more inputs that includes selection of a second action option of the second plurality of action options, wherein the second action option is associated with a second action different from the first action; means for, in response to receiving the second set of one or more inputs, configuring the computer system to perform the second action on detection of the alternative double tap input on the back surface of the housing; means for displaying, via the display generation component, a third plurality of action options for a triple tap input on the back surface of the housing, wherein the triple tap input is a triple tap input that satisfies a third set of input criteria; means for, while displaying the third plurality of action options for the triple tap input on the back surface of the housing, receiving, via the one or more input devices, a third set of one or more inputs that includes selection of a third action option of the third plurality of action options, wherein the third action option is associated with a third action different from the first action and the second action; means for in response to receiving the third set of one or more inputs, configuring the computer system to perform the third action on detection of the triple tap input on the back surface of the housing; means for displaying, via the display generation component, a fourth plurality of action options for an alternative triple tap input on the back surface of the housing, wherein the alternative triple tap input is a triple tap input that satisfies a fourth set of input criteria different from the third set of input criteria; means for, while displaying the fourth plurality of action options for the alternative triple tap input on the back surface of the housing, receiving, via the one or more input devices, a fourth set of one or more inputs that includes selection of a fourth action option of the fourth plurality of action options, wherein the fourth action option is associated with a fourth action; means for, in response to receiving the fourth set of one or more inputs, configuring the computer system to perform the fourth action on detection of the alternative triple tap input on the back surface of the housing; means for, after receiving the first set of one or more inputs, the second set of one or more inputs, the third set of one or more inputs, and the fourth set of one or more inputs, detecting, via the one or more input devices, a user input; and means for, in response to detecting the user input: in accordance with a determination that the user input is a double tap input on the back surface of the housing, performing the first action; in accordance with a determination that the user input is the alternative double tap input on the back surface of the housing, performing the second action; in accordance with a determination that the user input is a triple tap input on the back surface of the housing, performing the third action; and in accordance with a determination that the user input is the alternative triple tap input on the back surface of the housing, performing the fourth action.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for assigning and responding to user inputs, thereby increasing the effectiveness, efficiency, and user satisfaction with such devices. Such methods and interfaces may complement or replace other methods for assigning and responding to user inputs.

DESCRIPTION OF THE FIGURES

For a better understanding of the various described embodiments, reference should be made to the Description of Embodiments below, in conjunction with the following drawings in which like reference numerals refer to corresponding parts throughout the figures.

DESCRIPTION OF EMBODIMENTS

Figure 1A:
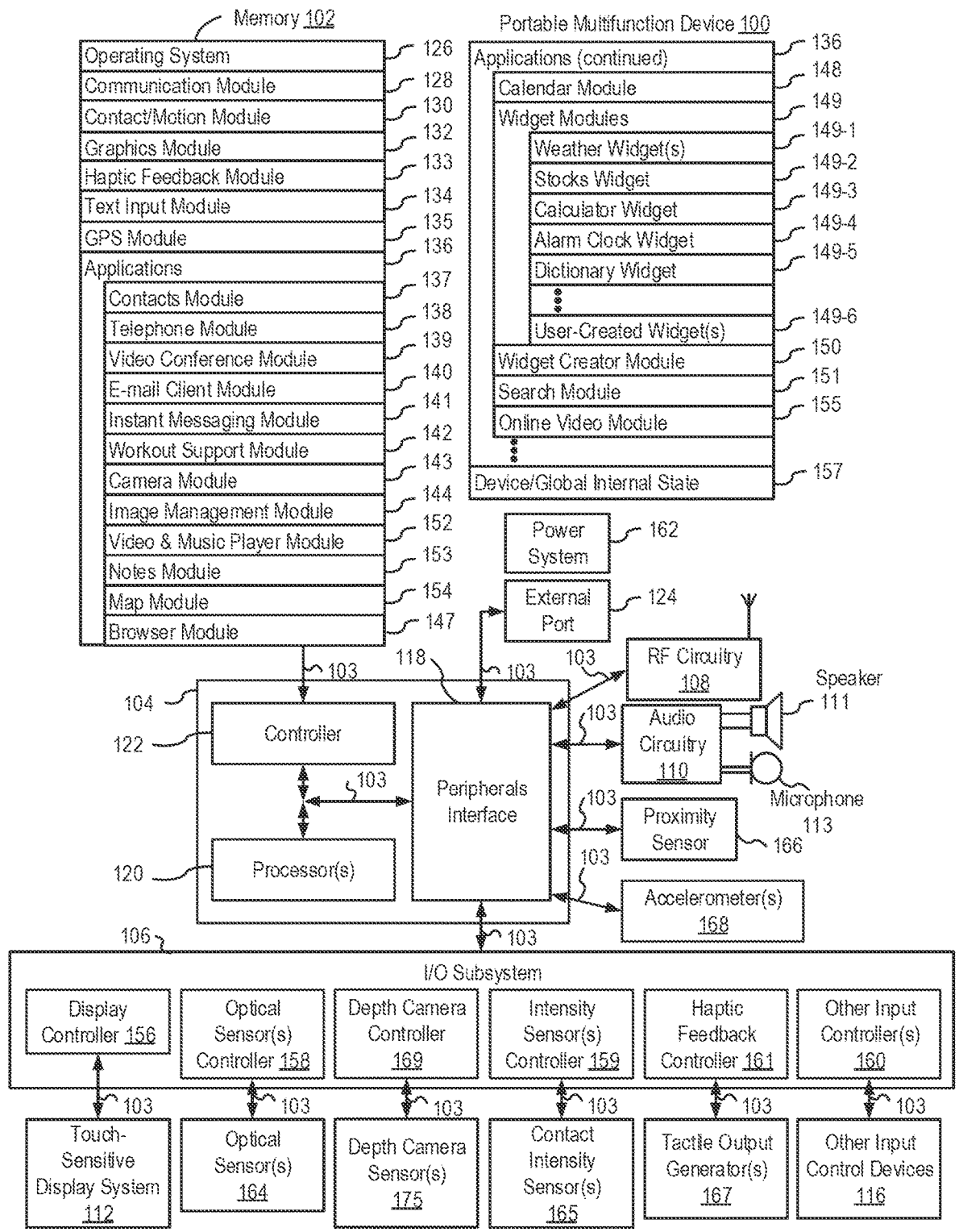
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for assigning and responding to user inputs. For example, a user would benefit from being able to assign custom tasks to various user inputs. Such techniques can reduce the cognitive burden on a user who requires certain tasks to be performed frequently or more easily, thereby enhancing productivity. Further, such techniques can reduce processor and battery power otherwise wasted on redundant user inputs.

Below, FIGS. 1A-1B, 2, 3, 4A-4B, and 5A-5B provide a description of exemplary devices for performing the techniques for managing event notifications. FIGS. 6A-6S illustrate exemplary user interfaces for assigning and responding to user inputs. FIGS. 7A-7D are a flow diagram illustrating methods of assigning and response to user inputs in accordance with some embodiments. The user interfaces in FIGS. 6A-6S are used to illustrate the processes described below, including the processes in FIGS. 7A-7D.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures) as input. In some embodiments, the one or more input devices are integrated with the computer system. In some embodiments, the one or more input devices are separate from the computer system.

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228, 700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
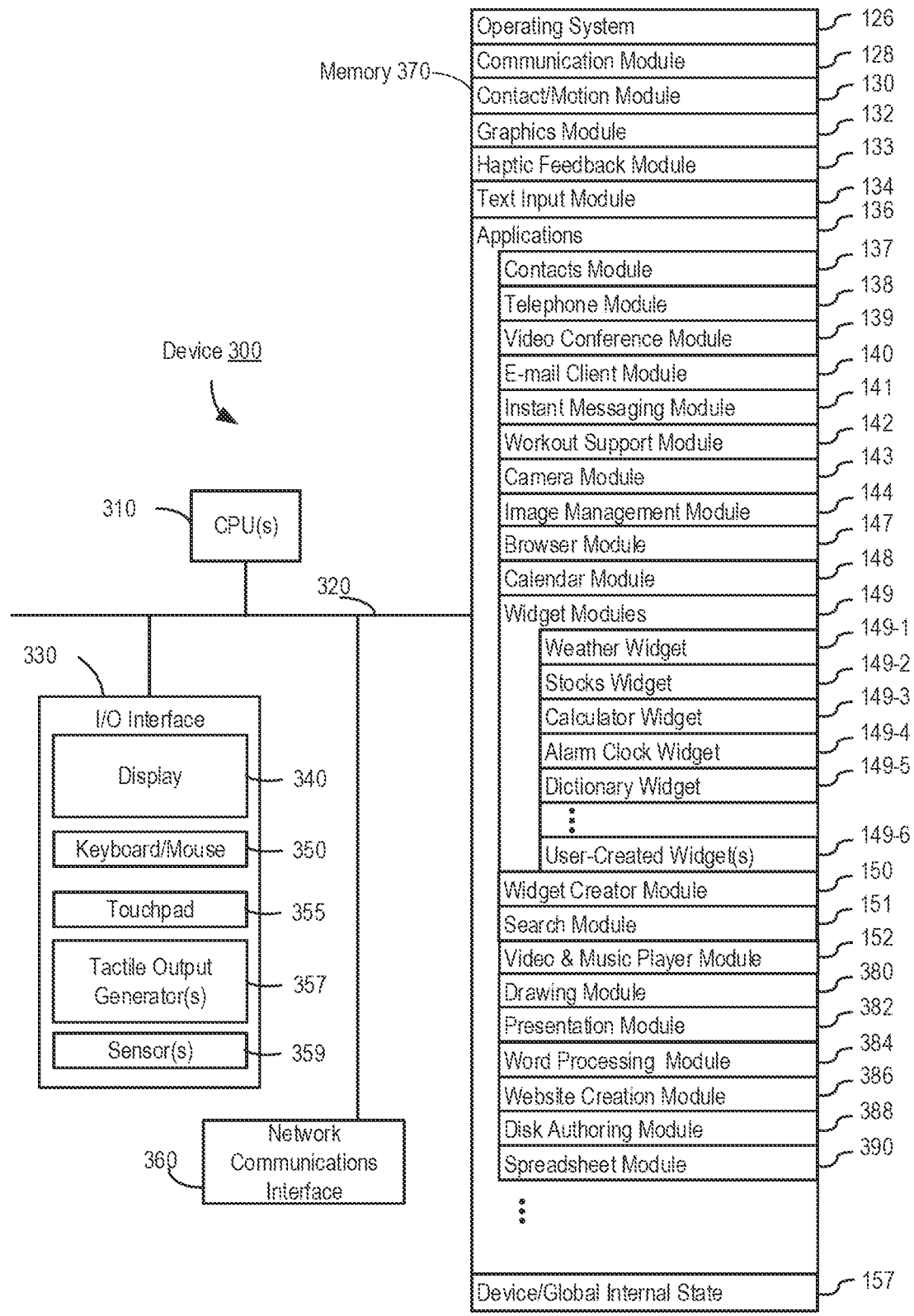
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:

Contacts module 137 (sometimes called an address book or contact list);
Telephone module 138;
Video conference module 139;
E-mail client module 140;
Instant messaging (IM) module 141;
Workout support module 142;
Camera module 143 for still and/or video images;
Image management module 144;
Video player module;
Music player module;
Browser module 147;
Calendar module 148;
Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
Widget creator module 150 for making user-created widgets 149-6;
Search module 151;
Video and music player module 152, which merges video player module and music player module;
Notes module 153;
Map module 154; and/or
Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
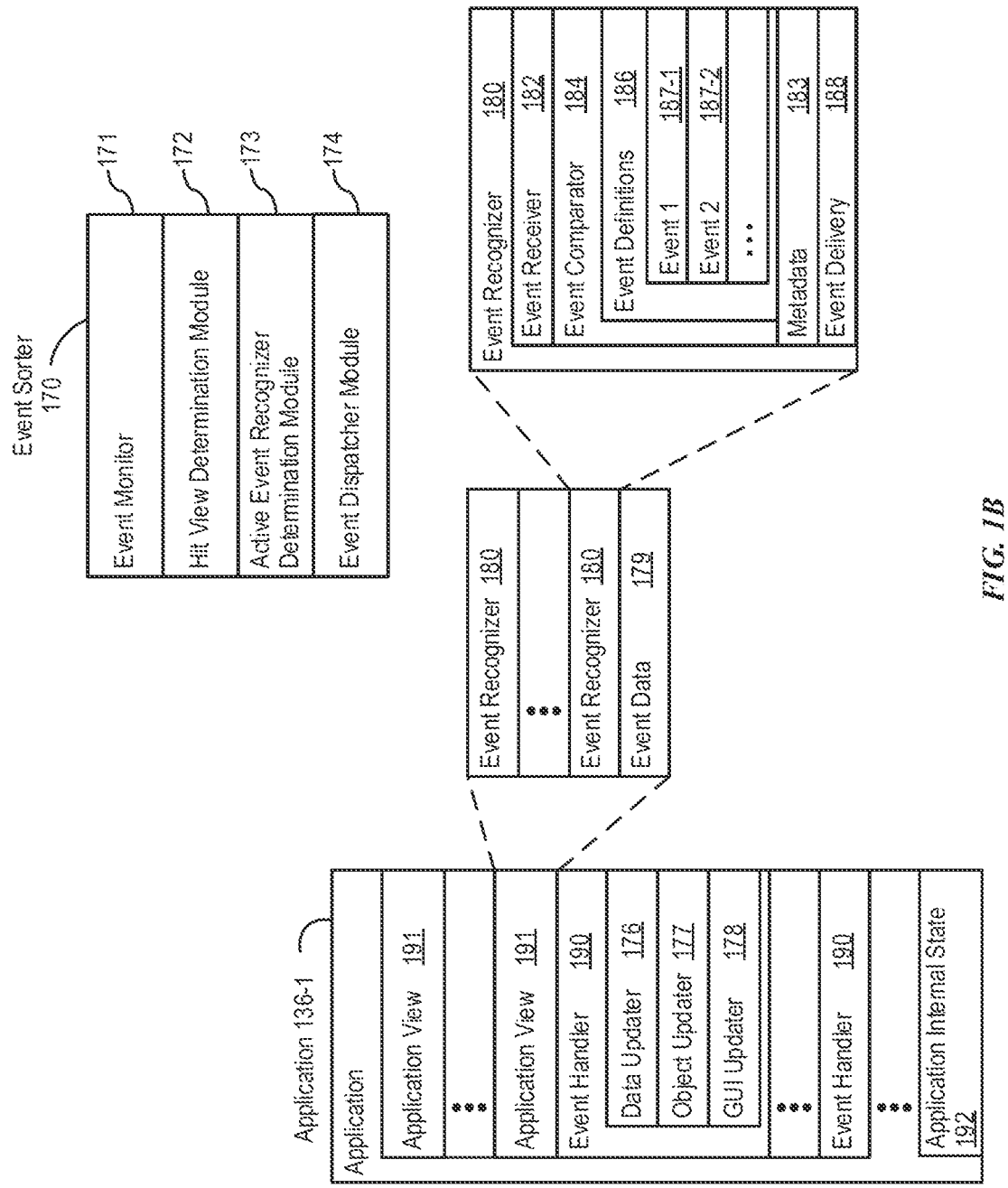
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
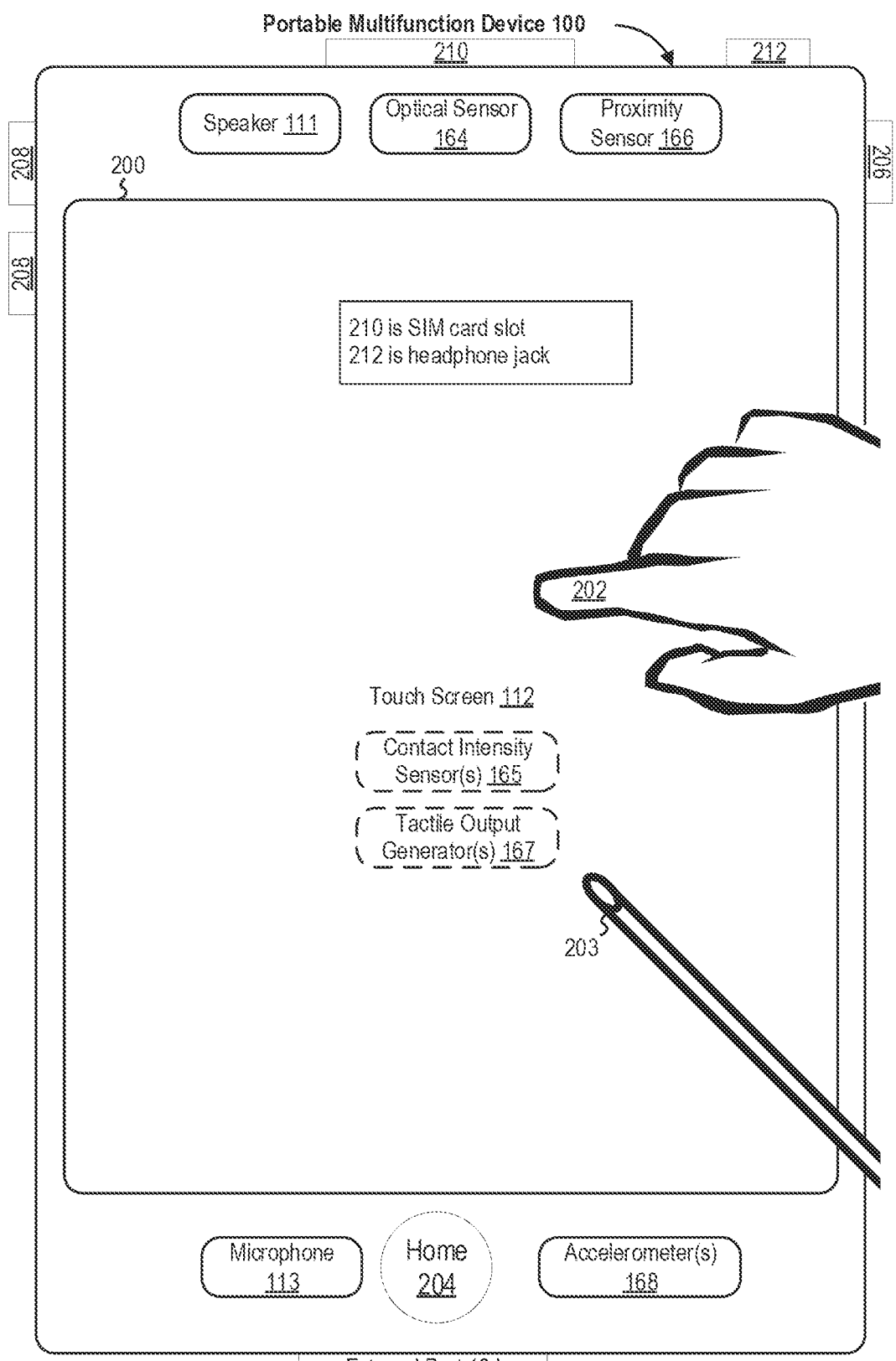
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
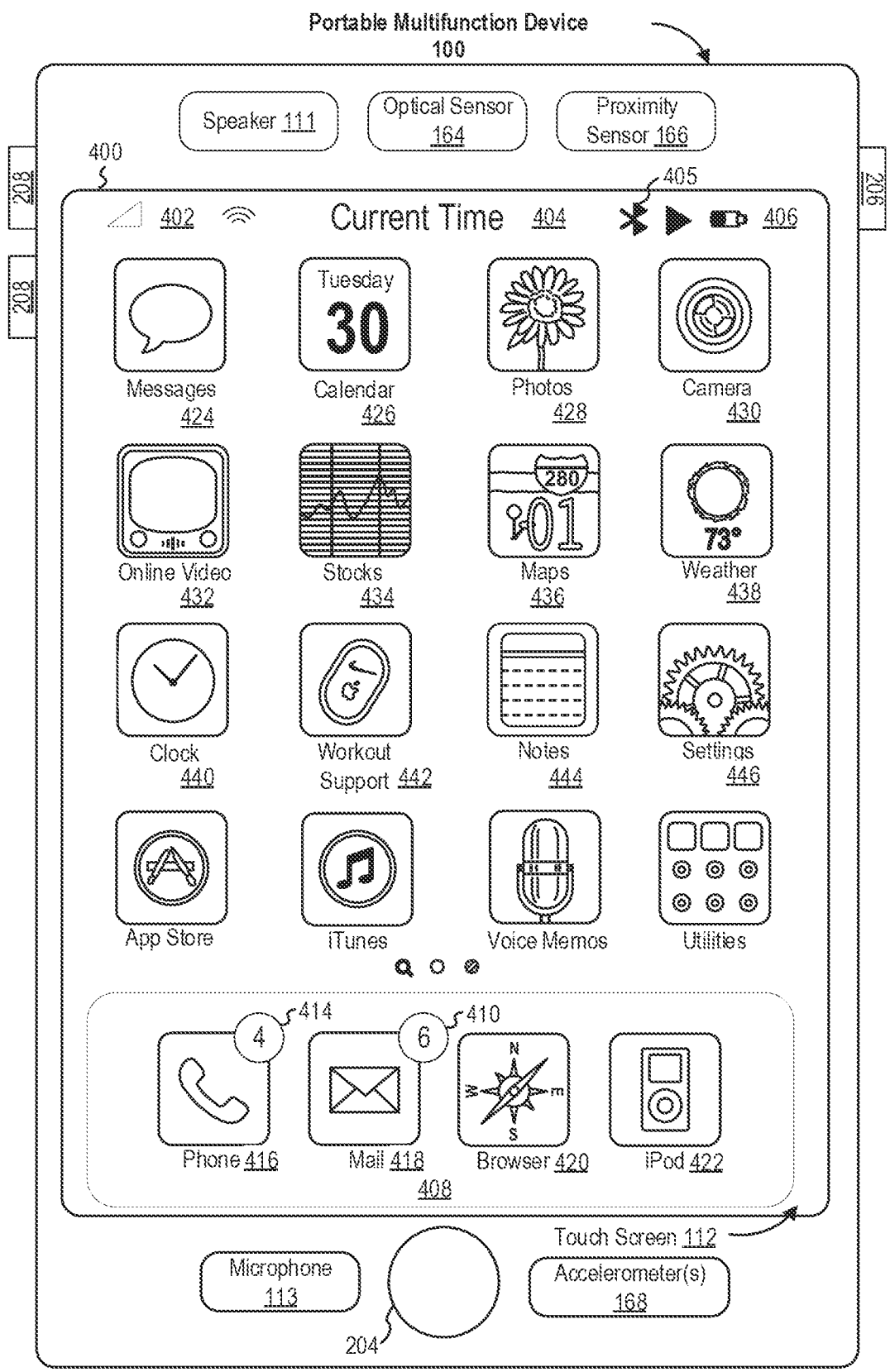
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
    Icon 416 for telephone module 138, labeled "Phone," which optionally includes an indicator 414 of the number of missed calls or voicemail messages;
    Icon 418 for e-mail client module 140, labeled "Mail," which optionally includes an indicator 410 of the number of unread e-mails;
    Icon 420 for browser module 147, labeled "Browser;" and
    Icon 422 for video and music player module 152, also referred to as iPod (trademark of Apple Inc.) module 152, labeled "iPod;" and
Icons for other applications, such as:
    Icon 424 for IM module 141, labeled "Messages;"
    Icon 426 for calendar module 148, labeled "Calendar;"
    Icon 428 for image management module 144, labeled "Photos;"
    Icon 430 for camera module 143, labeled "Camera;"
    Icon 432 for online video module 155, labeled "Online Video;"
    Icon 434 for stocks widget 149-2, labeled "Stocks;"
    Icon 436 for map module 154, labeled "Maps;"
    Icon 438 for weather widget 149-1, labeled "Weather;"
    Icon 440 for alarm clock widget 149-4, labeled "Clock;"
    Icon 442 for workout support module 142, labeled "Workout Support;"
    Icon 444 for notes module 153, labeled "Notes;" and
    Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
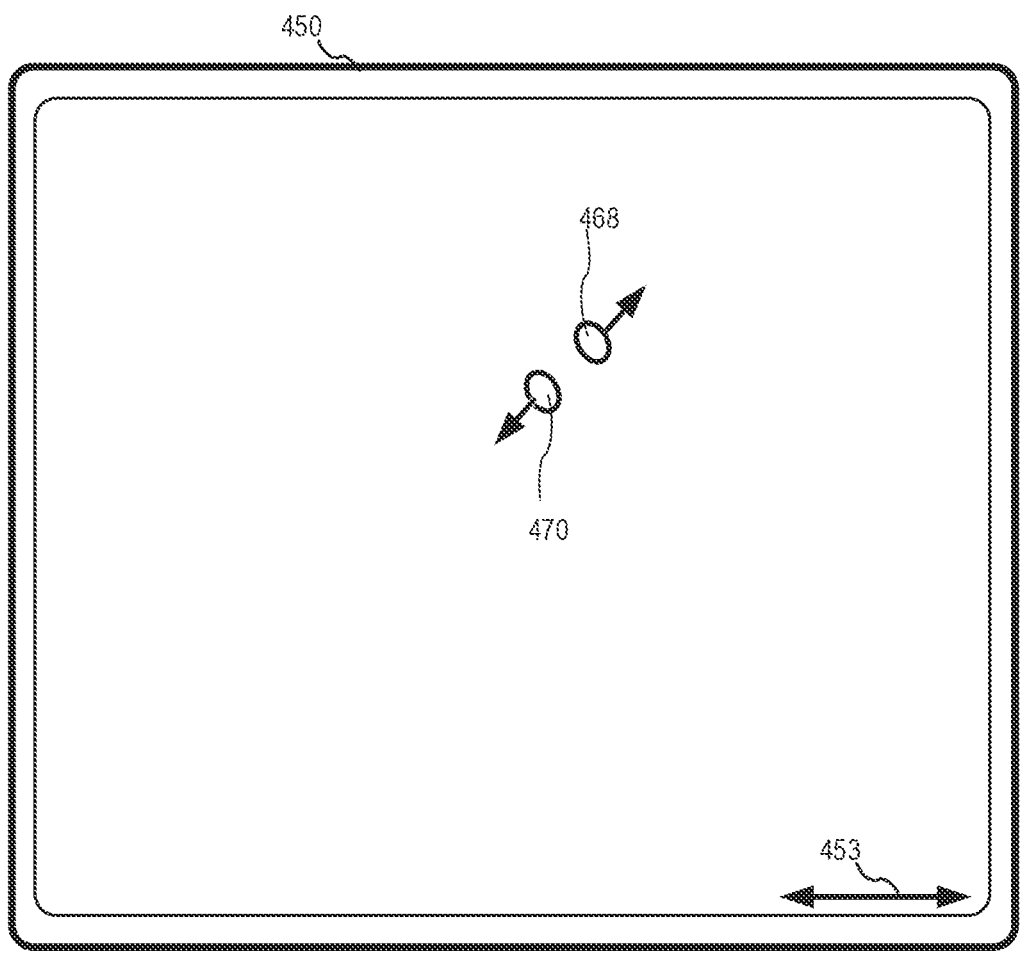
FIG. 4B illustrates an exemplary user interface for a multifunction device with a touch-sensitive surface that is separate from the display in accordance with some embodiments.
Figure 4B:
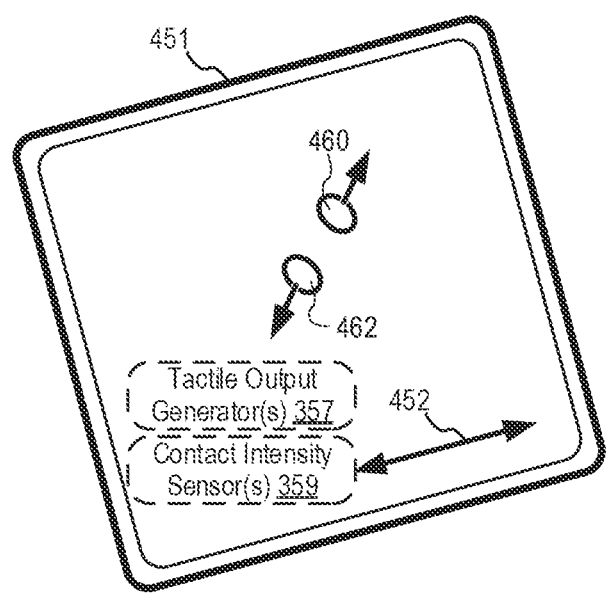

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
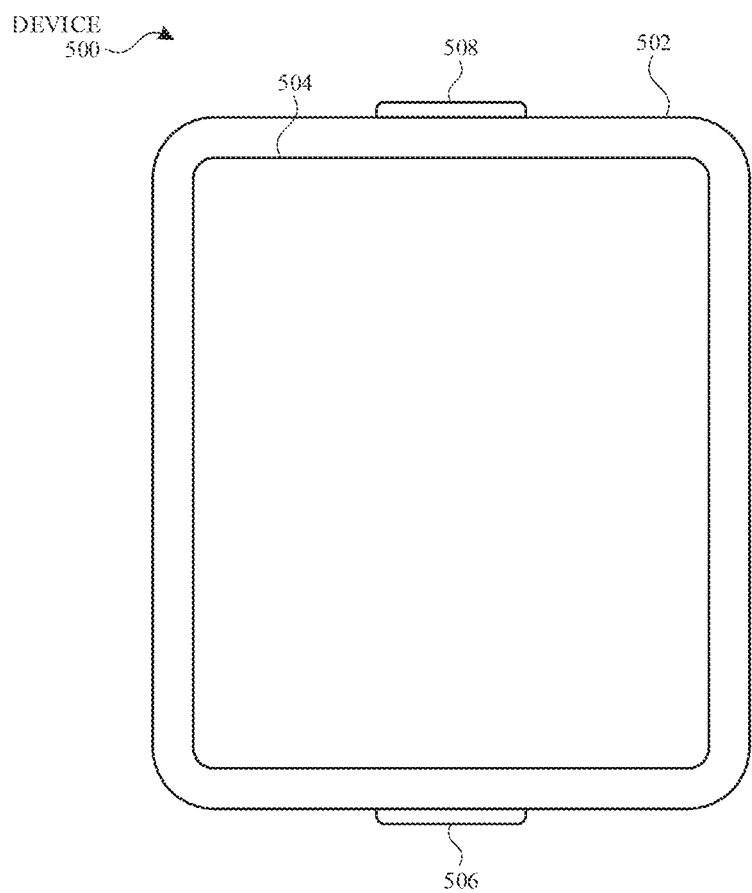
FIG. 5A illustrates a personal electronic device in accordance with some embodiments.
Figure 6A:
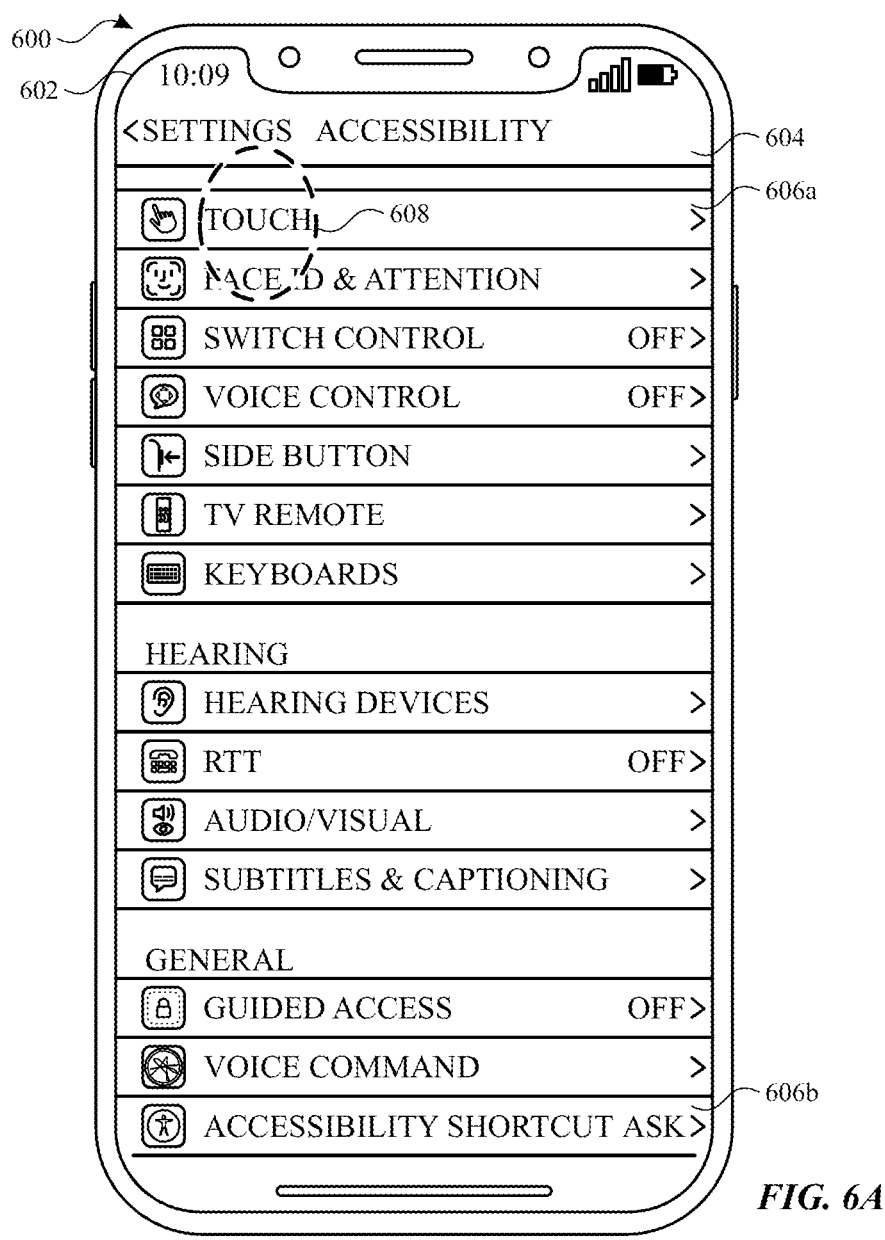
FIGS. 6A-6S illustrate exemplary user interfaces for assigning and responding to user inputs and responding to user inputs, in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
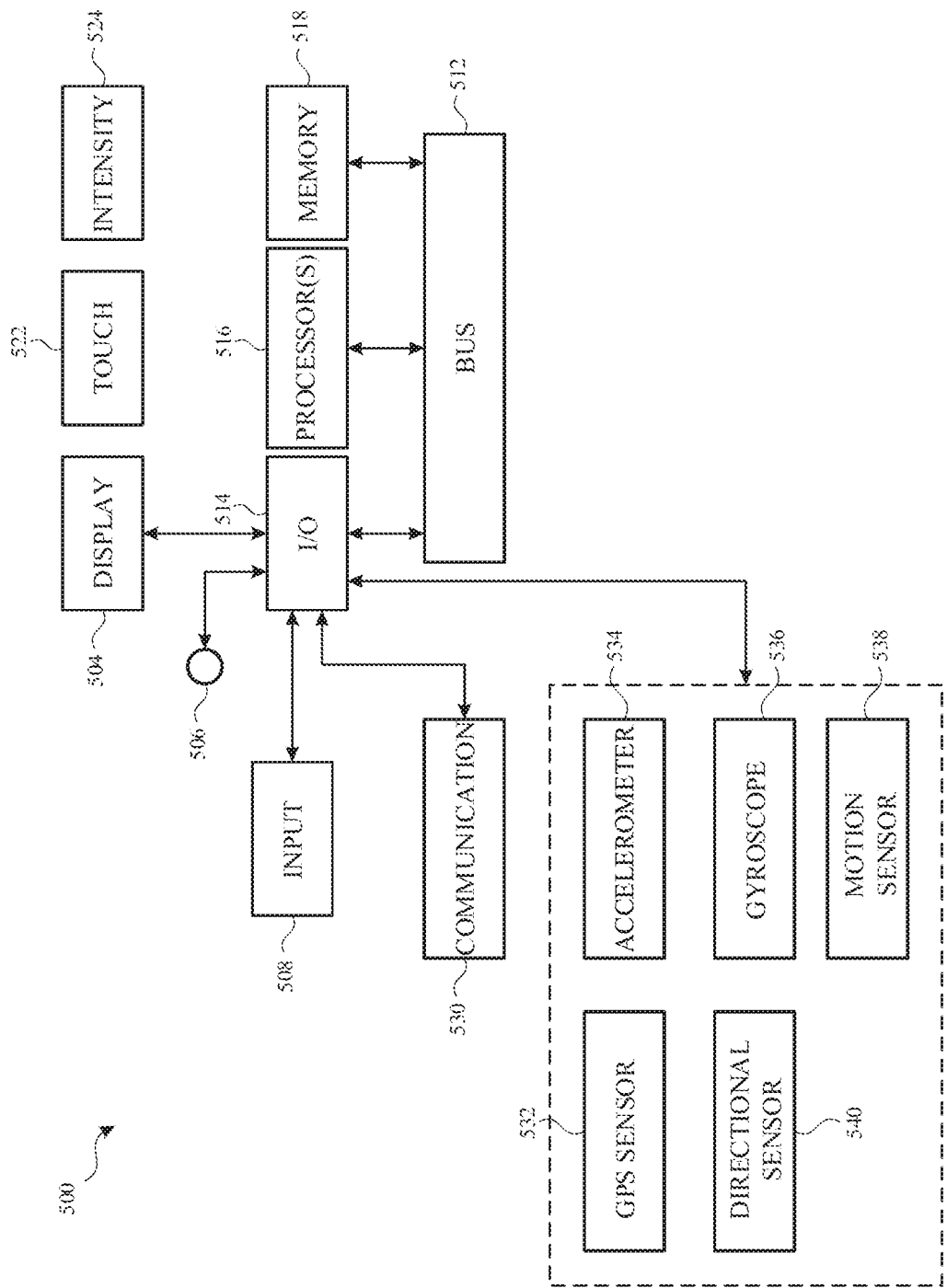
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including process 700 (FIGS. 7A-7D). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

an active application, which is currently displayed on a display screen of the device that the application is being used on;

a background application (or background processes), which is not currently displayed, but one or more processes for the application are being processed by one or more processors; and a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of user interfaces ("UI") and associated processes that are implemented on an electronic device, such as portable multifunction device 100, device 300, or device 500.

FIGS. 6A-6S illustrate exemplary user interfaces for assigning tasks to various user inputs, and responding to detection of those user inputs, in accordance with some embodiments. The user interfaces in these figures are used to illustrate the processes described below, including the processes in FIGS. 7A-7D.

FIG. 6A depicts electronic device 600, which is a smartphone with a display 602. Display 602 of electronic device 600 includes a touch-sensitive surface on which electronic device 600 can detect user gestures (e.g., tap, swipe, and/or drag). In some embodiments, electronic device 600 includes one or more features of electronic device 100, 300, and/or 500.

In FIG. 6A, electronic device 600 displays an accessibility settings user interface 604. The accessibility settings user interface 604 includes various selectable options including, inter alia, a "TOUCH" option 606a and an "ACCESSIBILITY SHORTCUT" option 606b. Selection of the "TOUCH" option 606a opens a touch settings user interface (as depicted in FIG. 6B), and selection of the "ACCESSIBILITY SHORTCUT" option 606b opens an accessibility shortcut user interface (as depicted in FIG. 6D1, described in greater detail below).

At FIG. 6A, while displaying the accessibility settings user interface 604, electronic device 600 detects input 608 at a location corresponding to "TOUCH" option 606a.

Figure 6B:
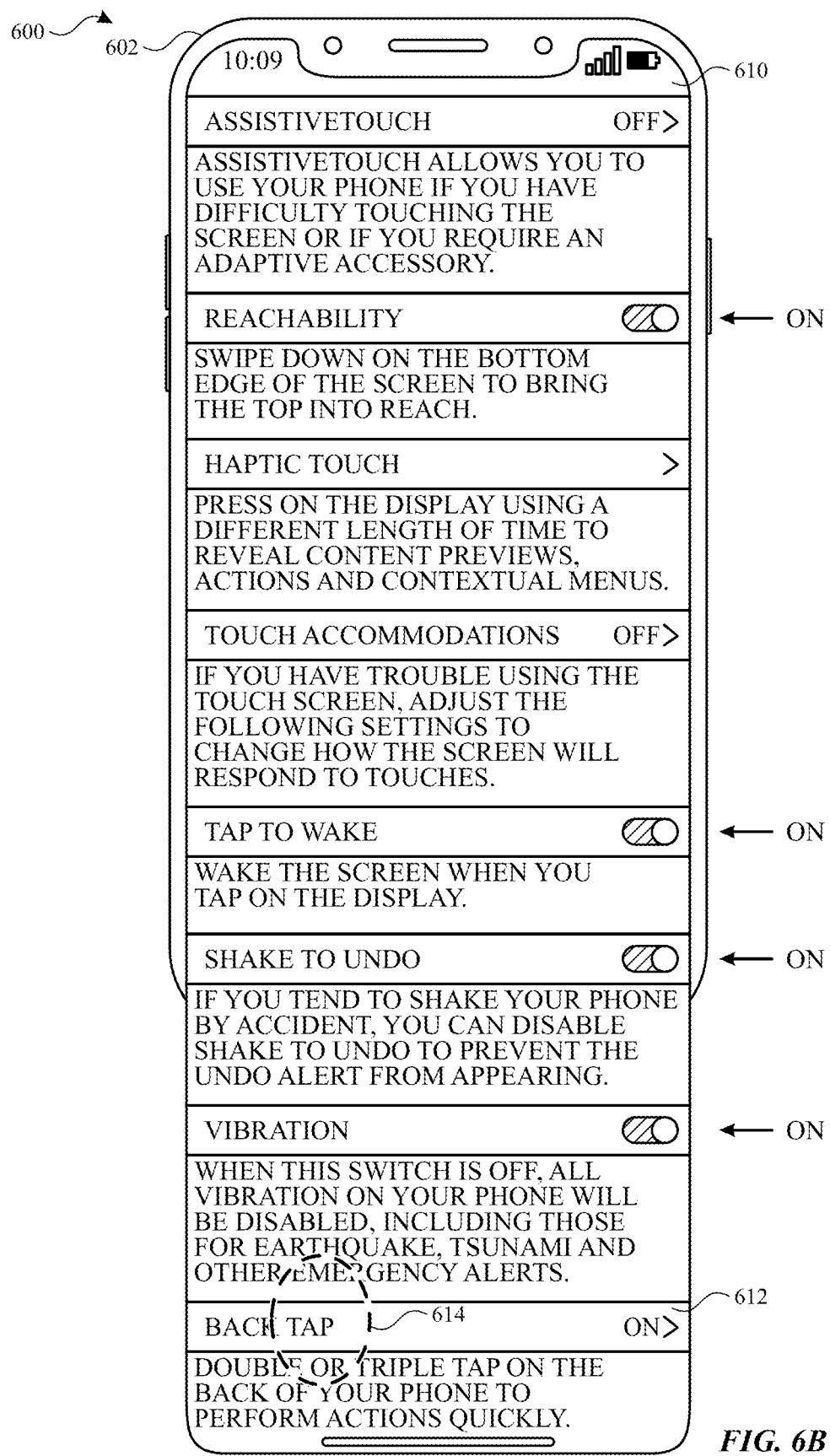

At FIG. 6B, in response to detecting input 608, electronic device 600 replaces display of the accessibility settings user interface 604 with a touch settings user interface 610. Touch settings user interface 610 includes various selectable options including, inter alia, a "BACK TAP" option 612.

At FIG. 6B, while displaying touch settings user interface 610, electronic device 600 detects input 614 at a location corresponding to "BACK TAP" option 612.

Figure 6C:
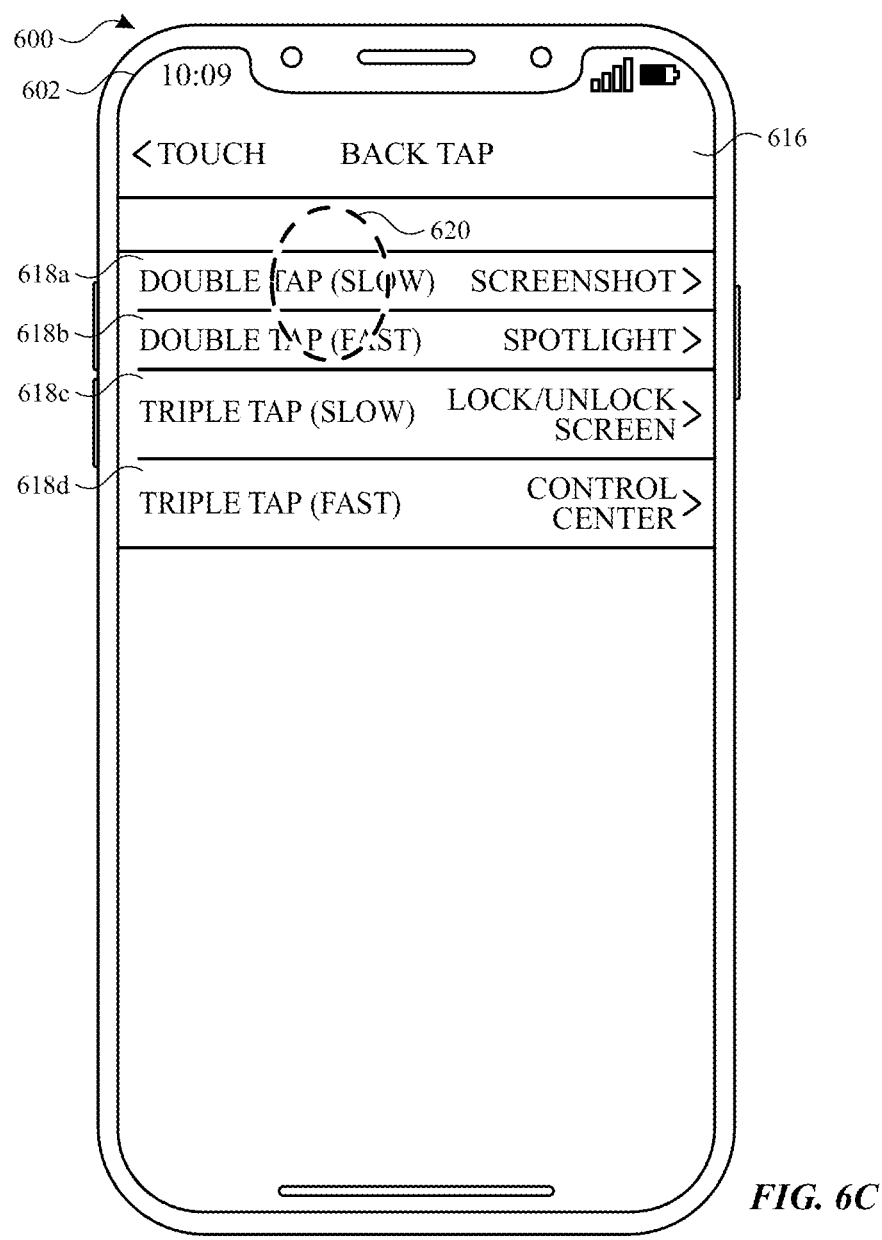
Figure 6D:
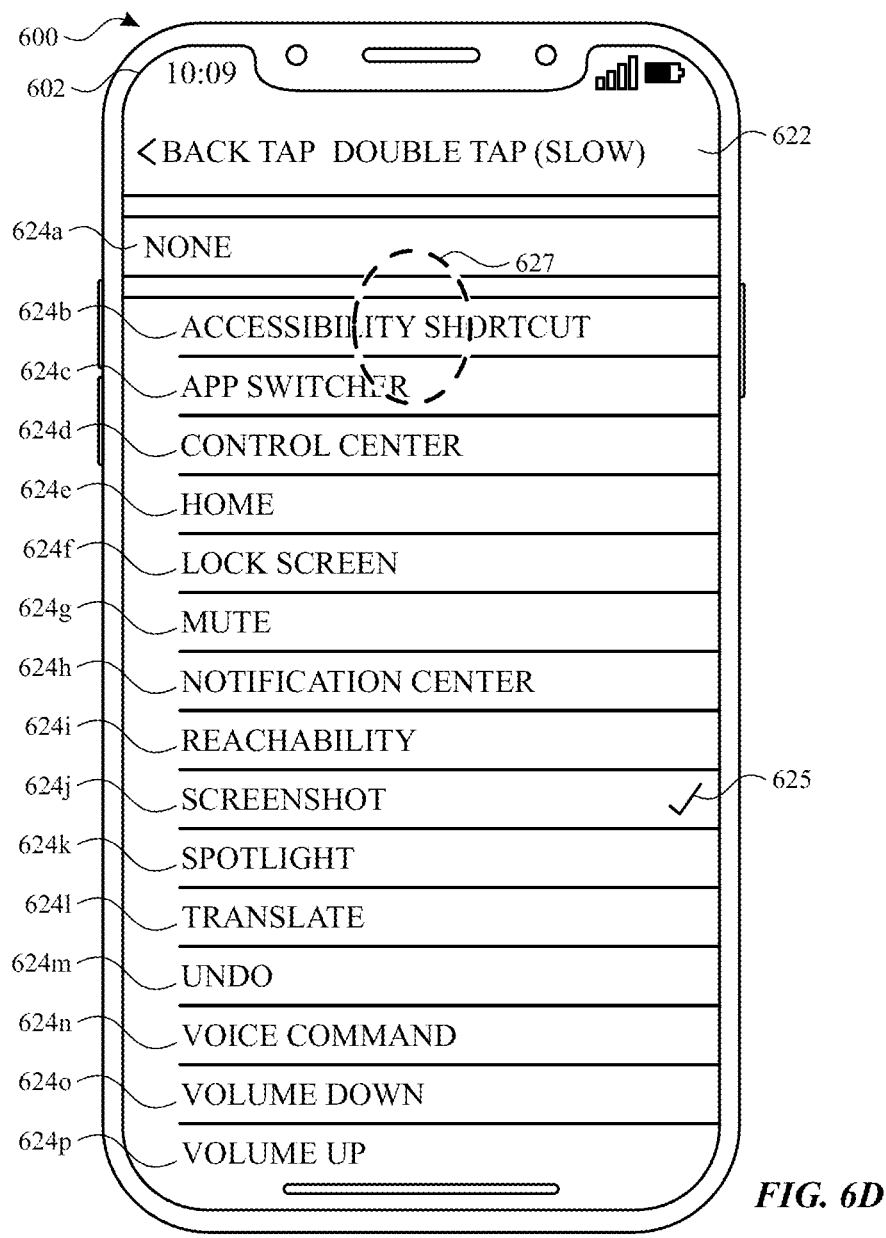

At FIG. 6C, in response to detecting input 614, electronic device 600 replaces display of the touch settings user interface 610 with a back tap settings user interface 616. Back tap settings user interface 616 includes a plurality of selectable options 618a-618d. Each selectable option 618a-618d corresponds to a respective type of user input that is performed by tapping on the back (e.g., the side opposite display 602) of electronic device 600: option 618a corresponds to a slow double tap user input, option 618b corresponds to a fast double tap user input, option 618c corresponds to a slow triple tap user input, and option 618d corresponds to a fast triple tap user input. Back tap settings user interface 616 and options 618a-618d can be used by a user to assign different tasks to each of these different types of user inputs, such that when a particular user input is detected by the electronic device 600, a corresponding user-assigned action will be performed. For example, as shown in FIG. 6C, back tap settings user interface 616 indicates that when a slow double tap user input is detected on a back portion (e.g., back surface) of the housing of the electronic device 600, a "screenshot" action will be performed; when a fast double tap user input is detected on the back portion of the housing of the electronic device 600, a "spotlight" action will be performed; when a slow triple tap user input is detected on the back portion of the housing of the electronic device 600, a "lock/unlock screen" action will be performed; and when a fast triple tap user input is detected on the back portion of the housing of the electronic device 600, a "control center" action will be performed. As will be demonstrated and described in greater detail herein, a user can select a respective option 618a-618d to change the task and/or action assigned to each of these user inputs. In some embodiments, a double tap input can be distinguished from a triple tap input based on the number of tap inputs detected. In some embodiments, a "slow" input can be distinguished from a "fast" input (e.g., slow double tap v. fast double tap, slow triple tap v. fast triple tap) based on the amount of time that elapses between taps and/or the amount of time that elapses between a first tap in an input and a final tap in the input (e.g., for a fast input, the first tap and the final tap occur within 0.25 milliseconds, for a slow input, the first tap and the final tap occur between 0.25 and 0.5 milliseconds of one another).

At FIG. 6C, while displaying back tap settings user interface 616, electronic device 600 detects input 620 at a location corresponding to option 618a, the double tap (slow) option.

At FIG. 6D, in response to detecting input 620, electronic device 600 replaces display of the back tap settings user interface 616 with a double tap (slow) user interface 622. Double tap (slow) user interface 622 includes a plurality of selectable options 624a-624p corresponding to various tasks that can be assigned to the slow double tap user input. Option 624a corresponds to an option to assign no task to the slow double tap user input such that detection of a slow double tap user input on a back surface of the electronic device 600 will not result in any task being performed by the electronic device 600. Option 624b corresponds to an option to assign an accessibility shortcut task to the slow double tap user input. In some embodiments, the accessibility shortcut task can comprise zero, one, or more than one user-defined tasks. For example, a user can use another user interface (e.g., the accessibility shortcut user interface 656 depicted in FIG. 6D1) to assign zero, one, or more tasks to the accessibility shortcut task. In the example scenario depicted in FIG. 6D1, the accessibility shortcut task has been assigned to two different tasks by the user: assistive touch and smart invert. The user could optionally assign the accessibility shortcut task to zero, one, or more than one task. In some embodiments, and as will be described in greater detail below with reference to FIG. 6P, if the accessibility shortcut task is assigned to zero tasks, then performance of the accessibility shortcut task results in no task being performed. In some embodiments, if the accessibility shortcut task is assigned to only one task, then performance of the accessibility shortcut task results in the one task being performed. In some embodiments, if the accessibility shortcut task is assigned to more than one task, then performance of the accessibility shortcut task results in a user interface being presented which includes a plurality of selectable options, each selectable option corresponding to a respective task of the more than one tasks. A user can select one of the selectable options to perform the corresponding task.

Returning to FIG. 6D, option 624c corresponds to an option to assign an app switcher task to the slow double tap user input, such that detection of a slow double tap user input on a back surface of the electronic device 600 will initiate a process for switching focus from one open application on the electronic device 600 to another open application. Option 624d corresponds to an option to assign a control center task to the slow double tap user input, such that detection of a slow double tap user input on a back surface of the electronic device 600 will result in the electronic device 600 displaying a control center user interface. Option 624e corresponds to an option to assign a home task to the slow double tap user input, such that detection of a slow double tap user input on a back surface of the electronic device 600 will result in the electronic device 600 displaying a home user interface.

Option 624f corresponds to an option to assign a lock/unlock screen task to the slow double tap user input, such that detection of a slow double tap user input on a back surface of the electronic device 600 will result in the electronic device 600 entering a locked state if it is in an unlocked state at the time the user input is detected, or initiating a process to enter an unlocked state (e.g., displaying a password entry user interface, or initiating biometric authentication for unlock electronic device) if it is in a locked state at the time the user input is detected. Option 624g corresponds to an option to assign a mute task to the slow double tap user input, such that detection of a slow double tap user input on a back surface of the electronic device 600 will result in the electronic device 600 entering a mute state. Option 624h corresponds to an option to assign a notification center task to the slow double tap user input, such that detection of a slow double tap user input on a back surface of the electronic device 600 will result in the electronic device 600 displaying a notification user interface comprising one or more notifications pertaining to one or more applications.

Option 624i corresponds to an option to assign a reachability task to the slow double tap user input, such that detection of a slow double tap user input on a back surface of the electronic device 600 will result in the electronic device 600 transitioning the electronic device 600 between a reachability state and a normal state, depending on a current state of the electronic device 600. For example, if the electronic device 600 is in a normal state when the input is detected, the electronic device can transition to a reachability state in response to the input, and vice versa. In some embodiments, transitioning the electronic device 600 from a normal state to a reachability state comprises translating displayed content on the electronic device 600 in a first direction, such that certain displayed content is translated from a first location on the display to a different location on the display, and certain display content is translated off of the display (and is no longer displayed on the display). In some embodiments, transitioning the electronic device 600 from a reachability state to a normal state comprises translating displayed content on the electronic device 600 in a second direction (e.g., opposite the first direction), such that displayed content is translated from a first location on the display to a different location on the display, and certain content is translated onto the display (such that it was not previously displayed in the reachability state, but is now displayed in the normal state).

Option 624j corresponds to an option to assign a screenshot task to the slow double tap user input, such that detection of a slow double tap user input on a back surface of the electronic device 600 will result in the electronic device 600 taking a screenshot of displayed content. Option 624k corresponds to an option to assign a spotlight task to the slow double tap user input, such that detection of a slow double tap user input on a back surface of the electronic device 600 will result in the electronic device 600 displaying a search entry field for a user to enter one or more search terms. Option 624l corresponds to an option to assign a translate task to the slow double tap user input, such that detection of a slow double tap user input on a back surface of the electronic device 600 will result in the electronic device 600 translating one or more content items currently being displayed on the electronic device 600 into a different language (e.g., translating a displayed email, a displayed webpage, or a displayed user interface into a different language).

Option 624m corresponds to an option to assign an undo task to the slow double tap user input, such that detection of a slow double tap user input on a back surface of the electronic device 600 will result in the electronic device 600 undoing a task that was performed prior (e.g., immediately prior) to detection of the slow double tap user input. Option 624n corresponds to an option to assign a voice command task to the slow double tap user input, such that detection of a slow double tap user input on a back surface of the electronic device 600 will result in the electronic device 600 entering a voice command state in which the electronic device 600 is prepared to receive one or more voice commands from a user. Option 624o corresponds to an option to assign a volume down task to the slow double tap user input, such that detection of a slow double tap user input on a back surface of the electronic device 600 will result in the electronic device 600 decreasing a volume setting. Option 624p corresponds to an option to assign a volume up task to the slow double tap user input, such that detection of a slow double tap user input on a back surface of the electronic device 600 will result in the electronic device 600 increasing a volume setting.

While various exemplary tasks have been described herein, it should be understood that additional, fewer, and/or different tasks can be used without departing from the scope of the present disclosure.

In FIG. 6D, an indicator 625 indicates that the slow double tap user input is currently assigned to the "screenshot" task.

At FIG. 6D, while displaying double tap (slow) user interface 622, electronic device 600 detects input 627 at a location corresponding to option 624b, the accessibility shortcut option.

Figure 6E:
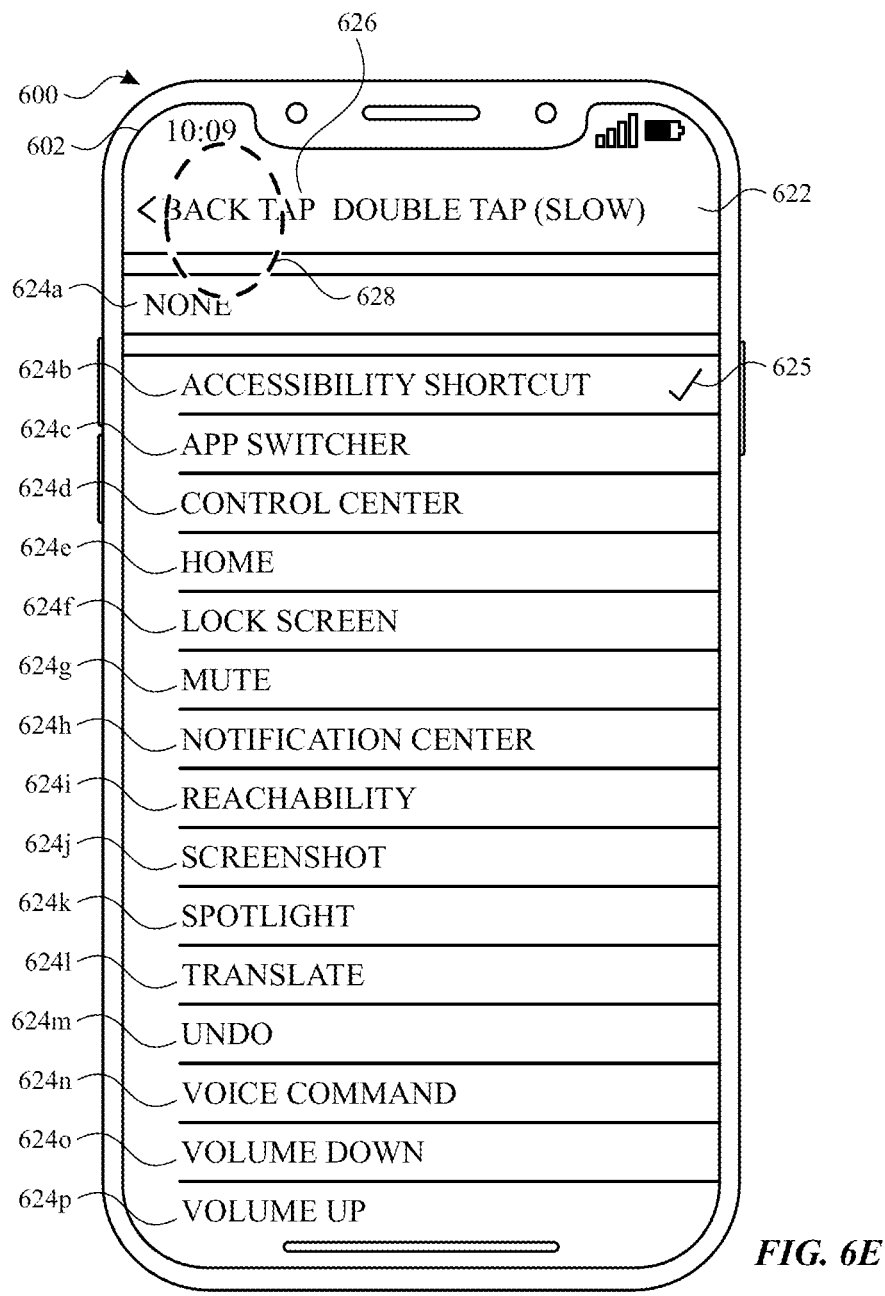

At FIG. 6E, in response to user input 627, electronic device 600 moves indicator 625 from the screenshot option 624j to the accessibility shortcut option 624b. Electronic device 600 is now configured to perform the accessibility shortcut task when a slow double tap user input is detected on a back surface of the electronic device 600.

At FIG. 6E, while displaying double tap (slow) user interface 622, electronic device 600 detects input 628 at a location corresponding to an option 626.

Figure 6F:
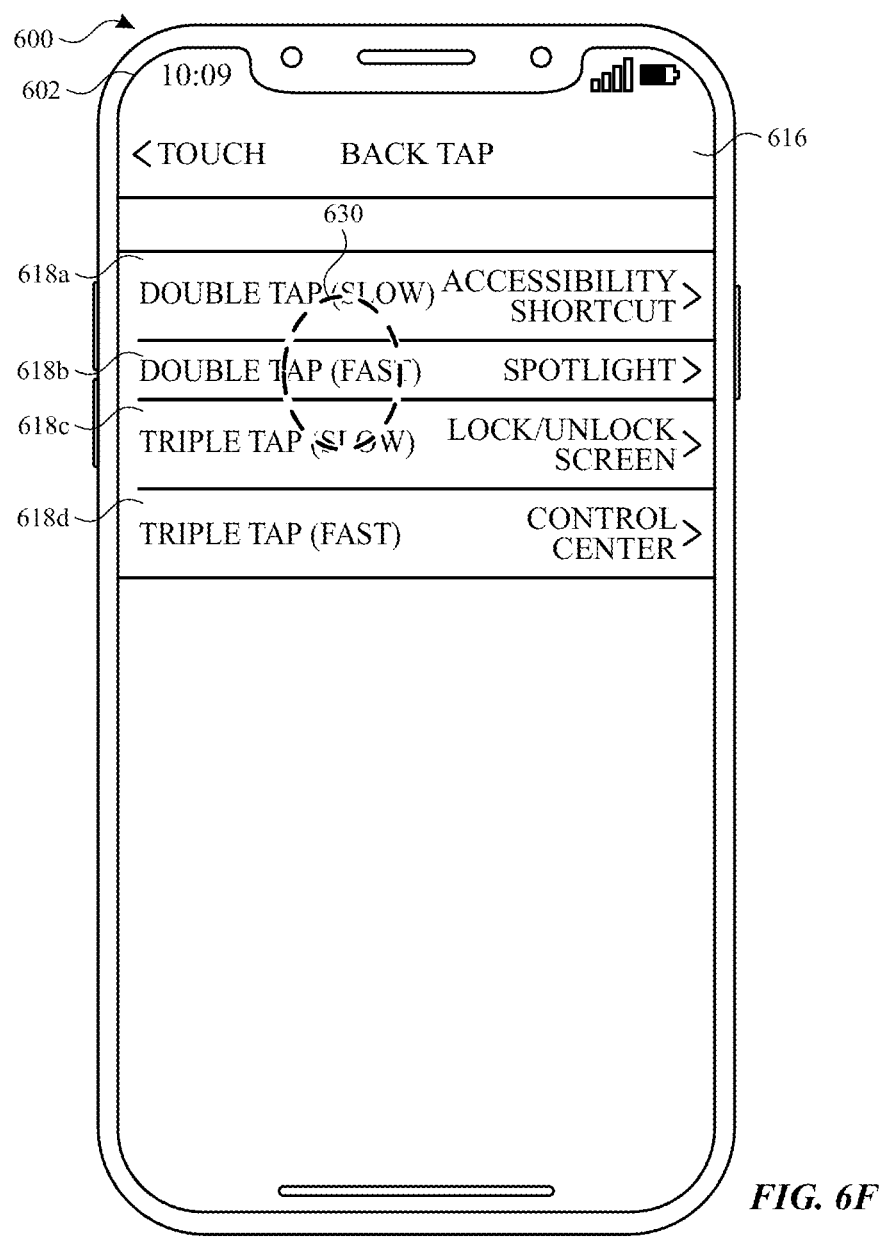

At FIG. 6F, in response to user input 628, electronic device 600 replaces display of double tap (slow) user interface 622 with back tap settings user interface 616. Back tap settings user interface 616 now indicates that the slow double tap user input has been assigned to the accessibility shortcut task.

At FIG. 6F, while displaying back tap settings user interface 616, electronic device 600 detects user input 630 at a location corresponding to option 618b, the double tap (fast) option.

Figure 6G:
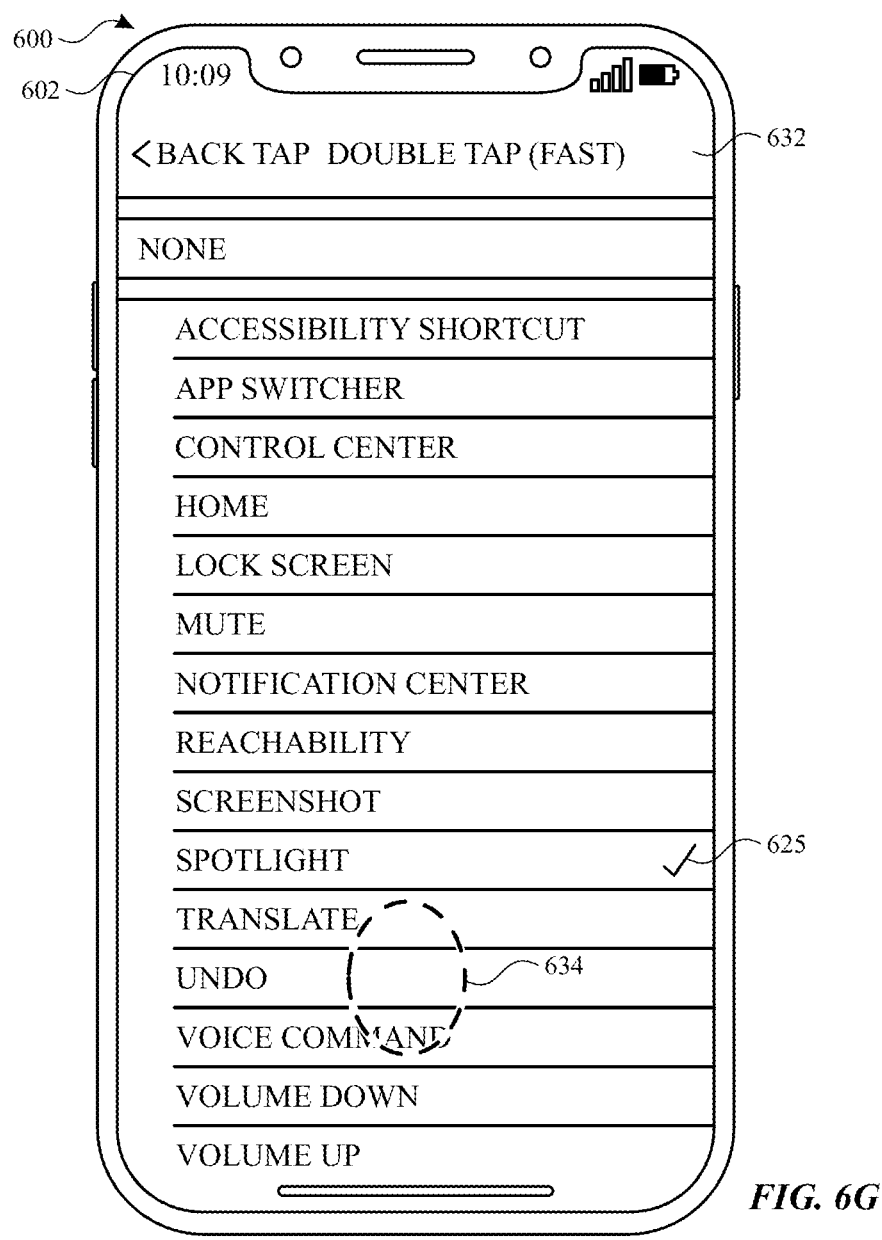

At FIG. 6G, in response to user input 630, electronic device 600 replaces display of back tap settings user interface 616 with double tap (fast) user interface 632. Double tap (fast) user interface 632 includes a plurality of selectable options corresponding to various tasks that can be assigned to a fast double tap user input. The selectable options in the double tap (fast) user interface 632 are the same as the plurality of selectable options 624a-p that were presented in the double tap (slow) user interface 622 of FIG. 6D. However, in different embodiments, different options can be presented for different user inputs.

In FIG. 6G, an indicator 625 indicates that the fast double tap user input is currently assigned to the "spotlight" task.

At FIG. 6G, while displaying the double tap (fast) user interface 632, electronic device 600 detects user input 634 at a location corresponding to the "undo" option.

Figure 6H:
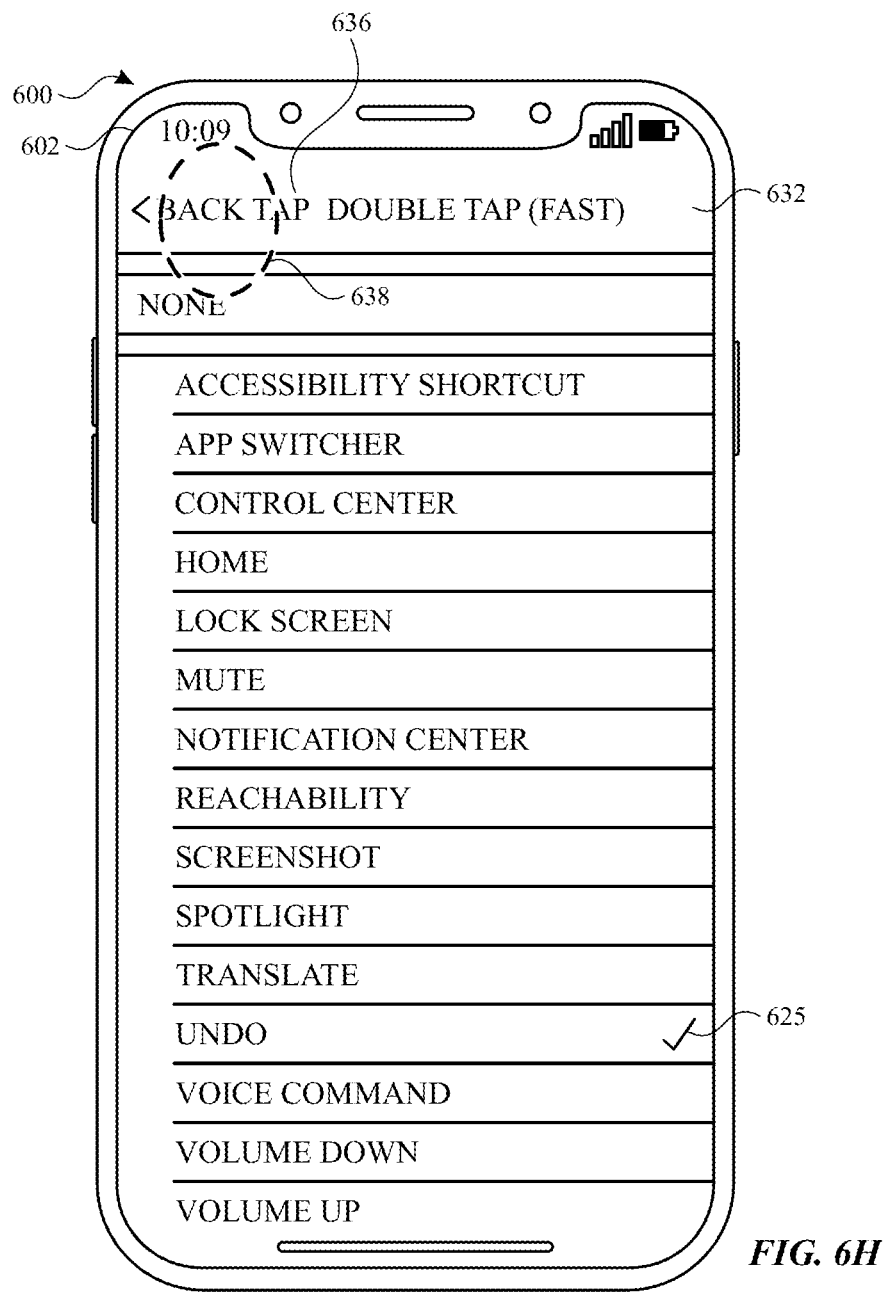

At FIG. 6H, in response to user input 634, electronic device 600 moves indicator 625 from the "spotlight" option to the "undo" option. Electronic device 600 is now configured to perform the undo task when a fast double tap user input is detected on a back surface of the electronic device 600.

At FIG. 6H, while displaying double tap (fast) user interface 632, electronic device 600 detects input 638 at a location corresponding to an option 636.

Figure 6I:
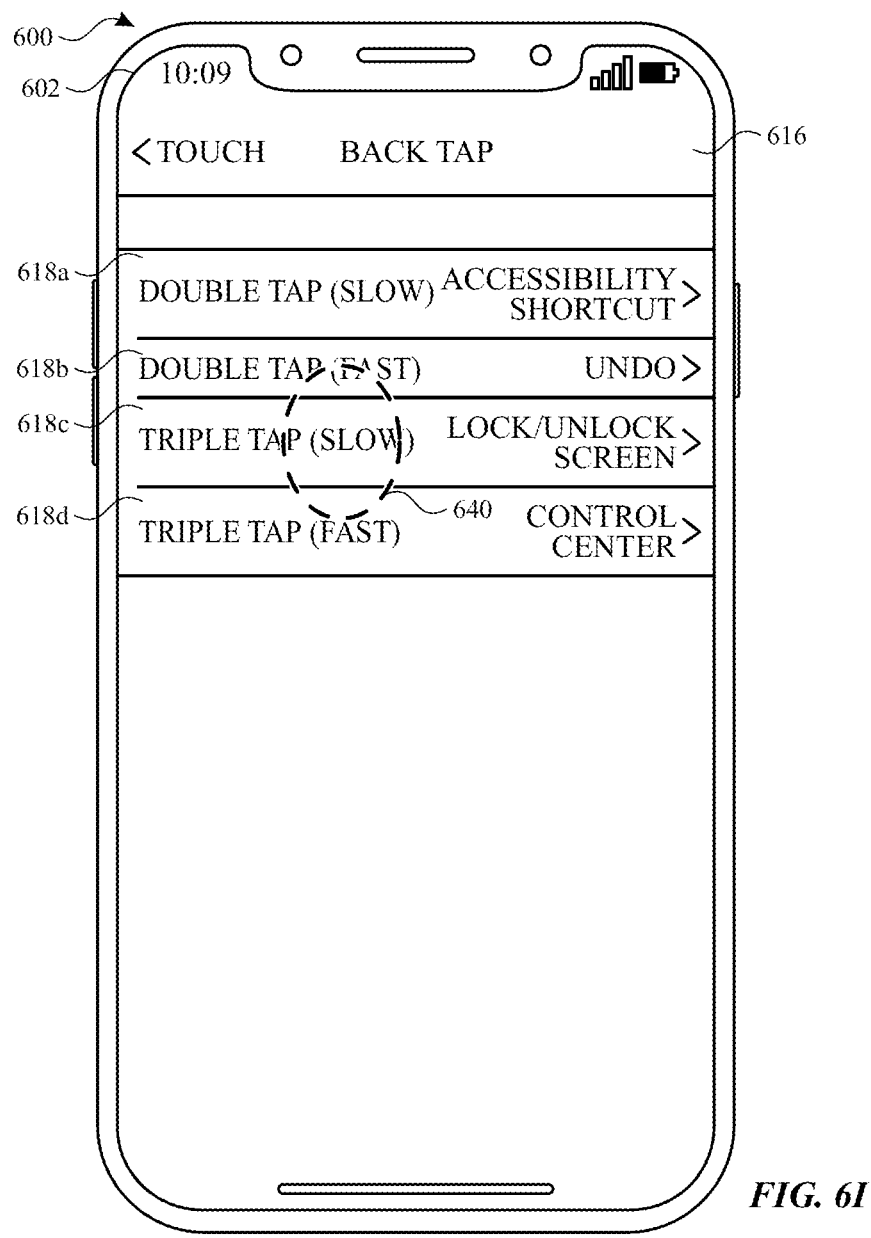

At FIG. 6I, in response to user input 638, electronic device 600 replaces display of double tap (fast) user interface 632 with back tap settings user interface 616. Back tap settings user interface 616 now indicates that the fast double tap user input has been assigned to the undo task.

At FIG. 6I, while displaying back tap settings user interface 616, electronic device 600 detects user input 640 at a location corresponding to option 618c, the triple tap (slow) option.

Figure 6J:
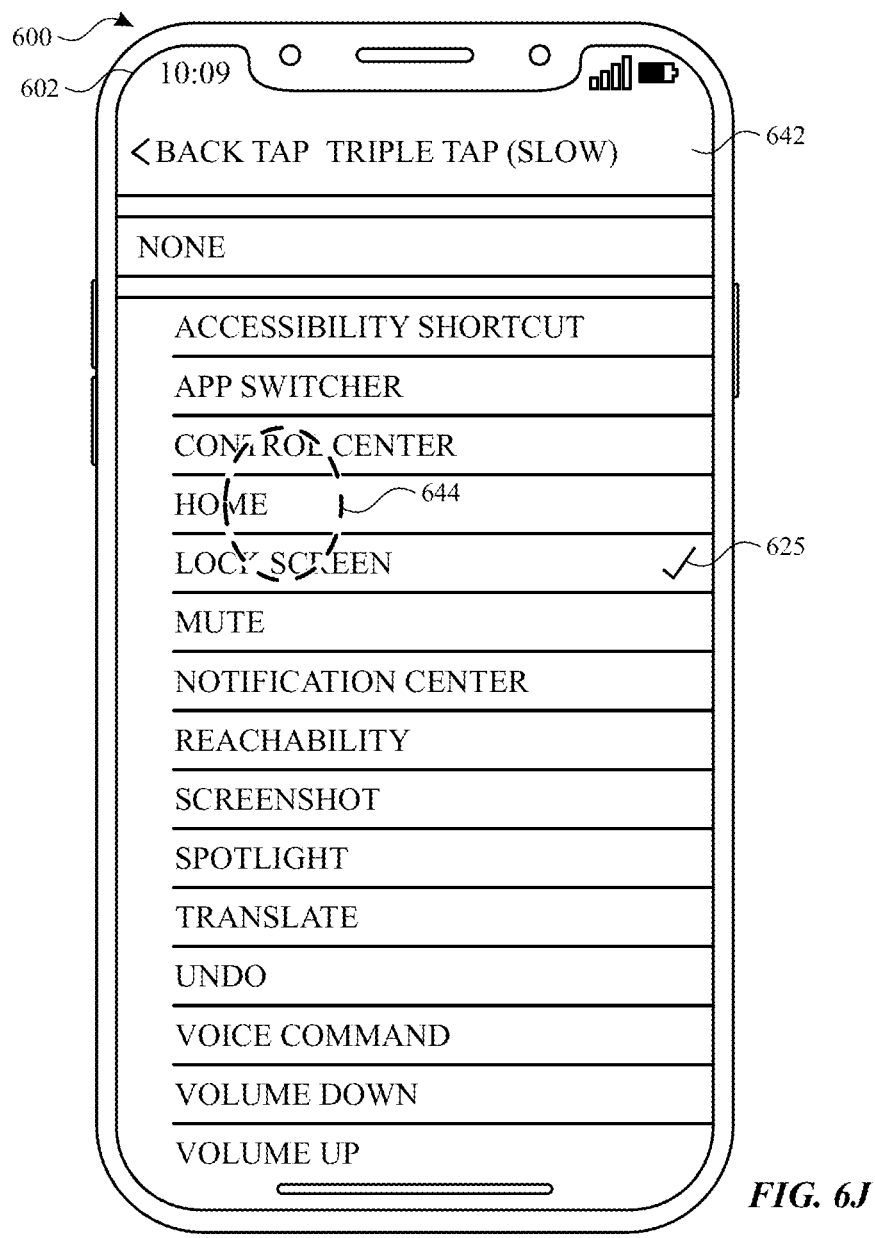

At FIG. 6J, in response to user input 640, electronic device 600 replaces display of back tap settings user interface 616 with triple tap (slow) user interface 642. Triple tap (slow) user interface 642 includes a plurality of selectable options corresponding to various tasks that can be assigned to a slow triple tap user input. The selectable options in the triple tap (slow) user interface 642 are the same as the plurality of selectable options 624a-p that were presented in the double tap (slow) user interface 622 of FIG. 6D and the plurality of selectable options that were presented in the double tap (fast) user interface 632 of FIG. 6G. However, in different embodiments, different options can be presented for different user inputs.

In FIG. 6J, an indicator 625 indicates that the slow triple tap user input is currently assigned to the "lock/unlock screen" task.

At FIG. 6J, while displaying the triple tap (slow) user interface 642, electronic device 600 detects user input 644 at a location corresponding to the "home" option.

Figure 6K:
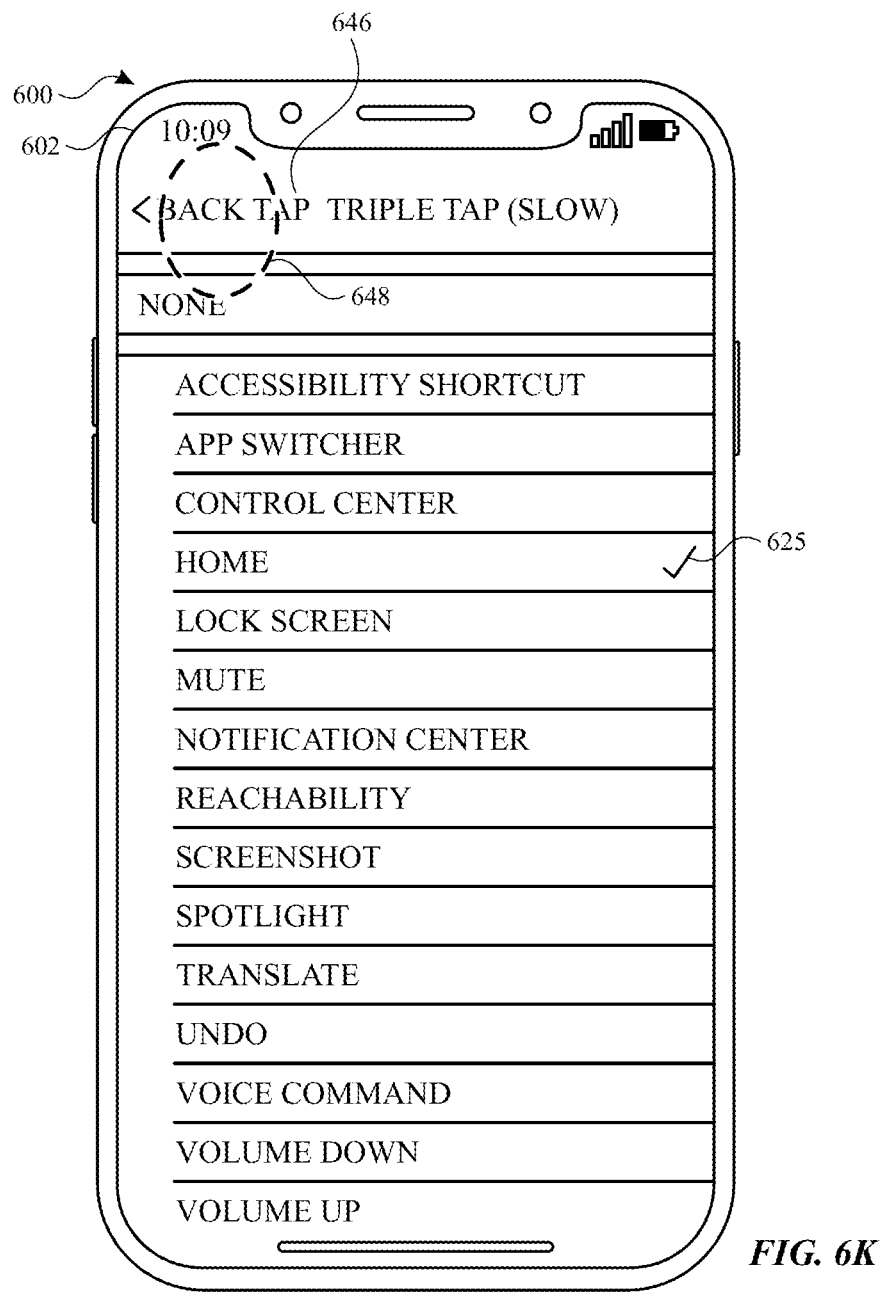

At FIG. 6K, in response to user input 644, electronic device 600 moves indicator 625 from the "lock/unlock screen" option to the "home" option. Electronic device 600 is now configured to perform the home task when a slow triple tap user input is detected on a back surface of the electronic device 600.

At FIG. 6K, while displaying triple tap (slow) user interface 642, electronic device 600 detects input 648 at a location corresponding to an option 646.

Figure 6L:
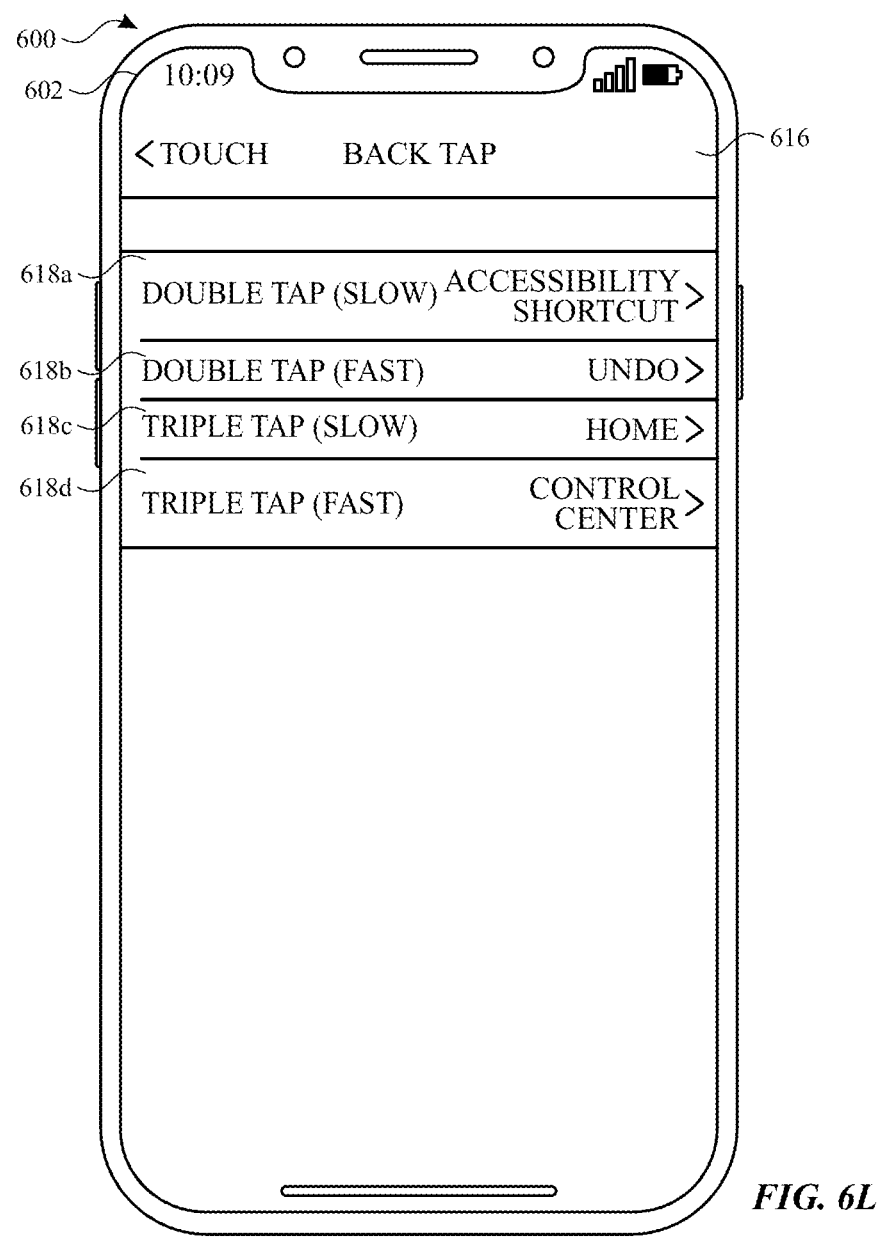

At FIG. 6L, in response to user input 638, electronic device 600 replaces display of triple tap (slow) user interface 642 with back tap settings user interface 616. Back tap settings user interface 616 now indicates that the slow triple tap user input has been assigned to the home task.

Figure 6M:
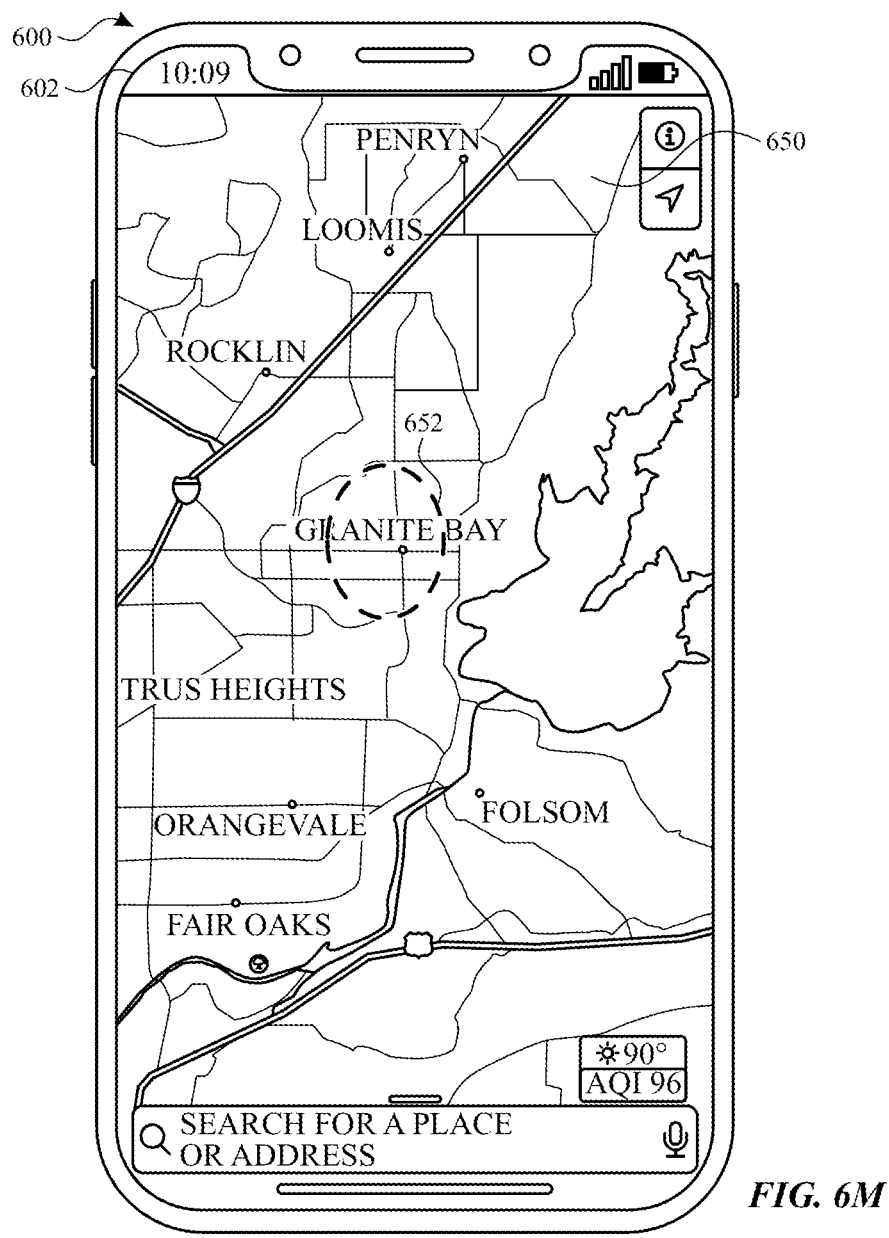

At FIG. 6M, electronic device 600 displays a user interface 650 for a map application, after the task assignment operations of FIGS. 6D-6L have been completed. While displaying the user interface 650, electronic device 600 detects input 652. In the depicted scenario, the input 652 is a double tap input on a front surface of the electronic device (e.g., on the touch-sensitive display 602) that causes the electronic device 600 to zoom in on user interface 650.

Figure 6N:
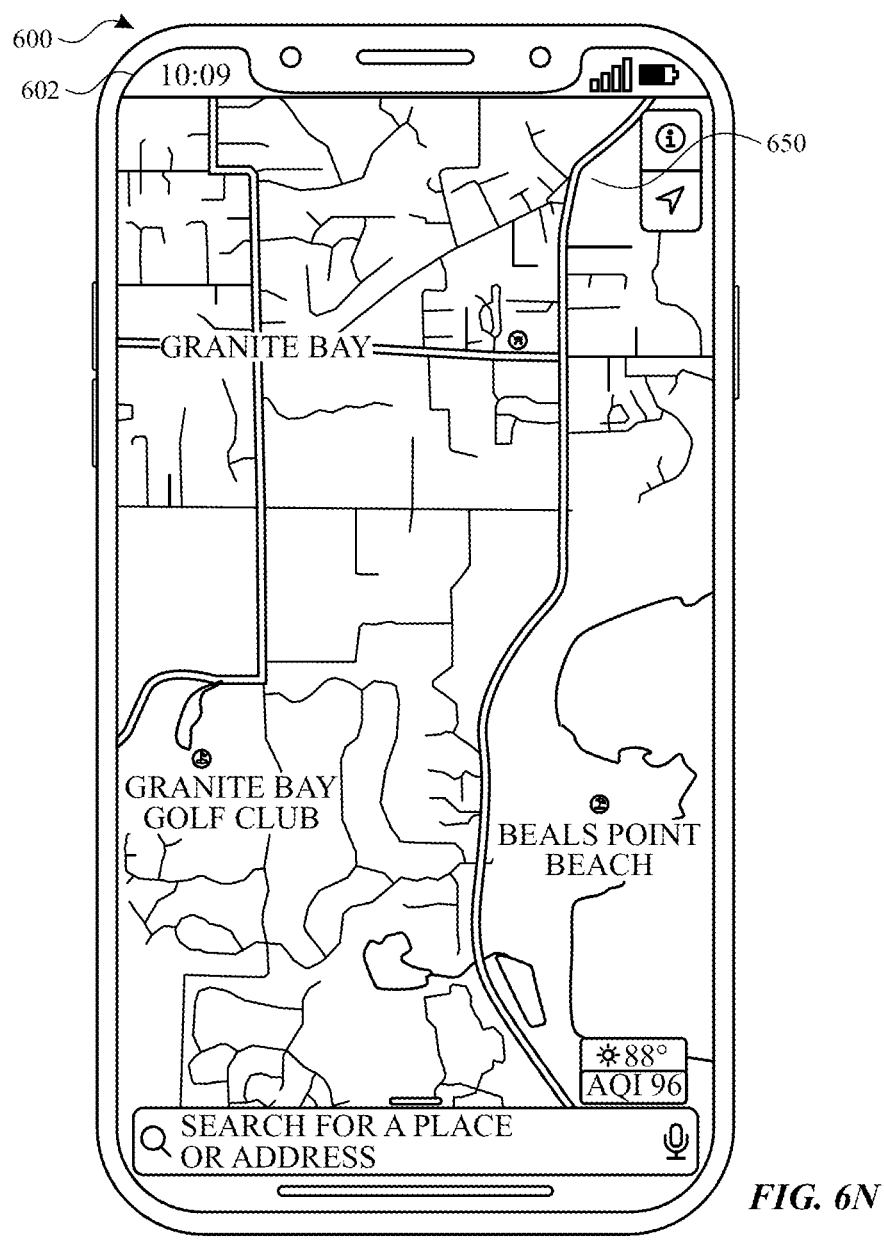

At FIG. 6N, in response to user input 652, electronic device 600 zooms in on user interface 650.

Figure 6O:
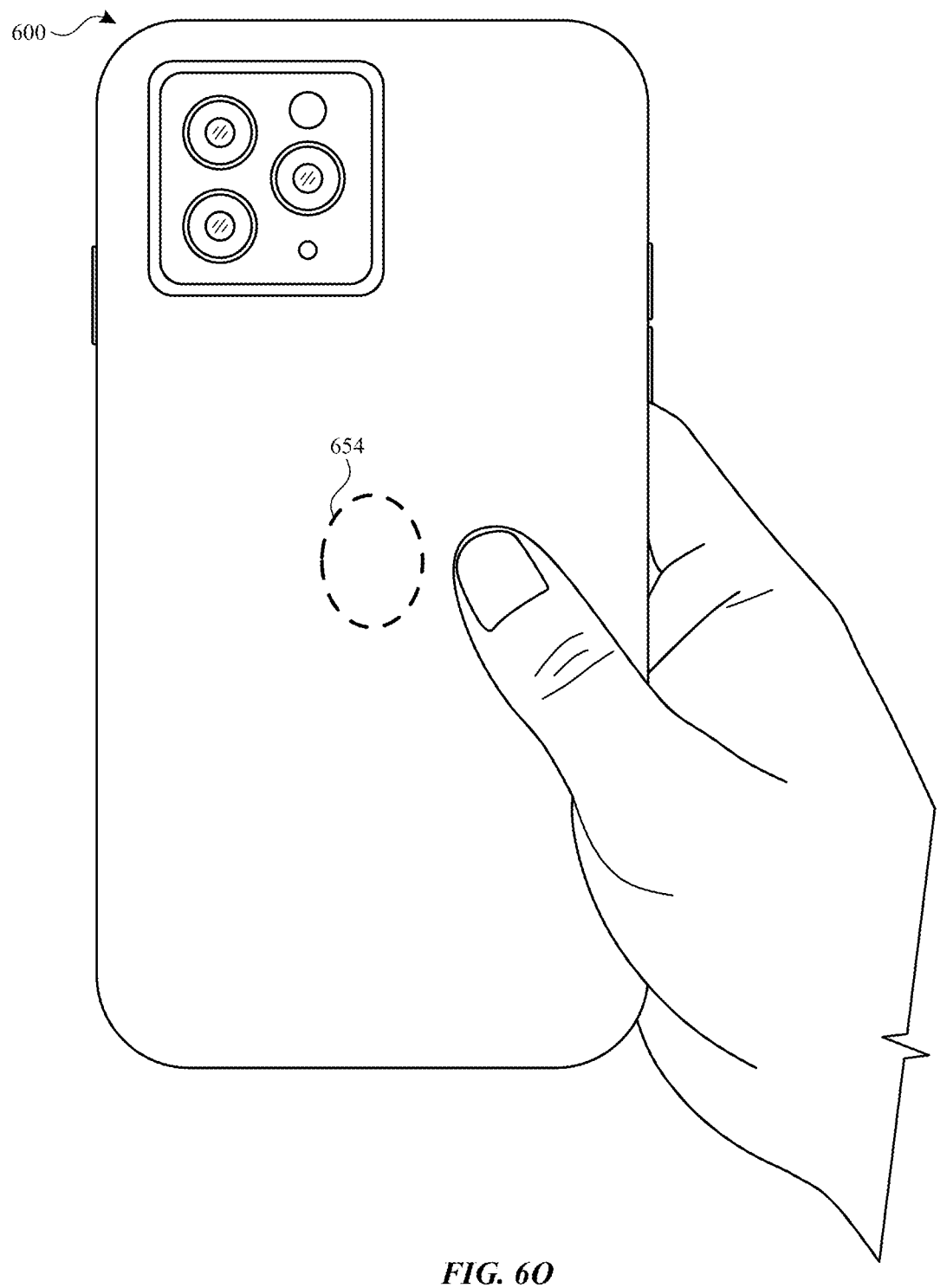

At FIG. 6O, after user input 652 and zooming in on user interface 650, electronic device 600 detects a user input 654 on a back surface the electronic device 600. As discussed above, depending on whether the user input 654 is determined to be a slow double tap input, a fast double tap input, a slow triple tap input, or a fast triple tap input, the electronic device 600 can take different actions. In some embodiments, a double tap input can be distinguished from a triple tap input based on the number of taps detected (e.g., 2 taps versus 3 taps). In some embodiments a slow input can be distinguished from a fast input (e.g., slow double tap v. fast double tap, slow triple tap v. fast triple tap) based on the amount of time that elapses between taps and/or the amount of time that elapses between a first tap in an input and a final tap in the input (e.g., for a fast input, the first tap and the final tap occur within x milliseconds, for a slow input, the first tap and the final tap occur between x and y milliseconds of one another, wherein y is greater than x).

In some embodiments, detection of a user input on a back surface of the electronic device 600 and/or determination of the type of user input that was received on the back surface of the electronic device 600 can be performed automatically. For example, such determinations can be made using a machine learning model. In some embodiments, the machine learning model can be configured to clear input data once a determination is made as to the type of user input that was received so that user inputs are not double counted. In some embodiments, in order to decrease the likelihood of false positives, user inputs on the back surface of the electronic device 600 can only be detected when the display 602 of the electronic device 600 is in an active (e.g., on) state. In other embodiments, user inputs on the back surface of the electronic device 600 can be detected regardless of whether the display 602 of the electronic device 600 is in an active state (e.g., in order to allow a user to input a back tap user input when the electronic device 600 is in the user's pocket or bag). In some embodiments, in order to decrease the likelihood of false positives, user inputs on the back surface of the electronic device 600 can be ignored if one or more user inputs are concurrently detected (e.g., within a threshold period of time) on a front surface of the electronic device 600 (e.g., on touch-sensitive display 602). In some embodiments, in order to decrease the likelihood of false positives, user inputs on the back surface of the electronic device 600 can be only be detected if a determination is made that the electronic device 600 is being held by a user.

Figure 6P:
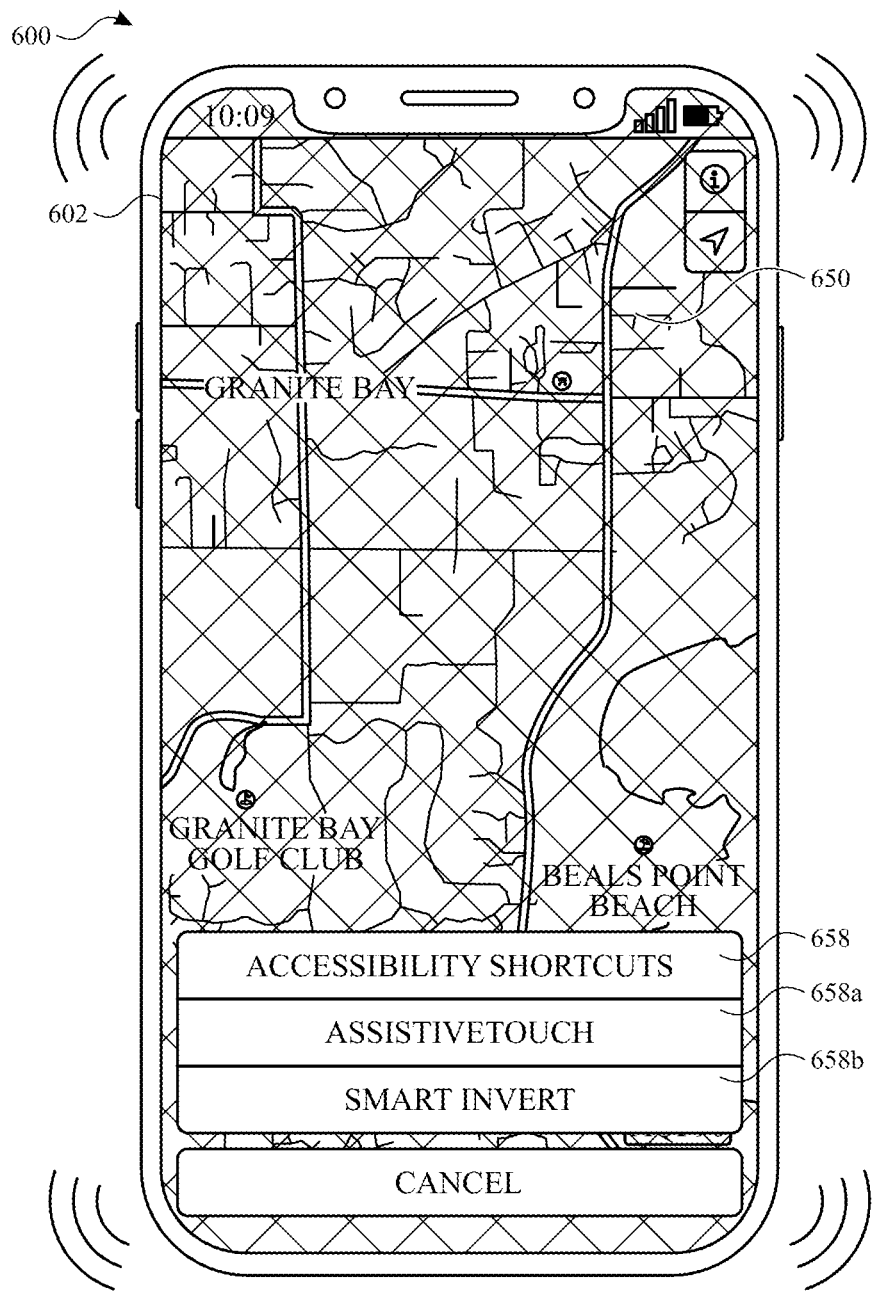

At FIG. 6P, electronic device 600 has determined that the user input 654 is a slow double tap input. As was shown in FIG. 6L, the slow double tap input is assigned to the "accessibility shortcut" task. Accordingly, in response to user input 654, electronic device 600 performs the accessibility shortcut task. In the depicted scenario, the accessibility shortcut task has been assigned to two different tasks by the user: assistive touch and smart invert (see, e.g., FIG. 6D1). In the depicted scenario, the user has utilized an accessibility shortcut user interface 656, shown in FIG. 6D1, to assign the accessibility shortcut task to these two tasks. The user could optionally assign the accessibility shortcut task to zero, one, or more than one task. In some embodiments, if the accessibility shortcut task is assigned to zero tasks, then performance of the accessibility shortcut task results in no task being performed. In some embodiments, if the accessibility shortcut task is assigned to only one task, then performance of the accessibility shortcut task results in the one task being performed. In some embodiments, if the accessibility shortcut task is assigned to more than one task, then performance of the accessibility shortcut task results in a user interface being presented which includes a plurality of selectable options, each selectable option corresponding to a respective task of the more than one tasks. A user can select one of the selectable options to perform the corresponding task.

In FIG. 6P, the accessibility shortcut task is assigned to more than one task: the assistive touch task and the smart invert task. Accordingly, in response to the determination that the user input 654 is a slow double tap input, electronic device 600 displays an accessibility shortcut popup user interface 658, which includes selectable options 658a, 658b corresponding to the two different tasks that are assigned to the accessibility shortcut task. The accessibility shortcut popup user interface 658 is overlaid on the map application user interface 650. The map application user interface 650 is also visually deemphasized (e.g., darkened, de-saturated) while the accessibility shortcut popular user interface 658 is presented. While the accessibility shortcut popup user interface 658 is displayed, a user can select an option 658a or 658b to perform a desired task. Furthermore, in response to user input 654, electronic device 600 outputs a tactile output (e.g., a haptic output).

Figure 6Q:
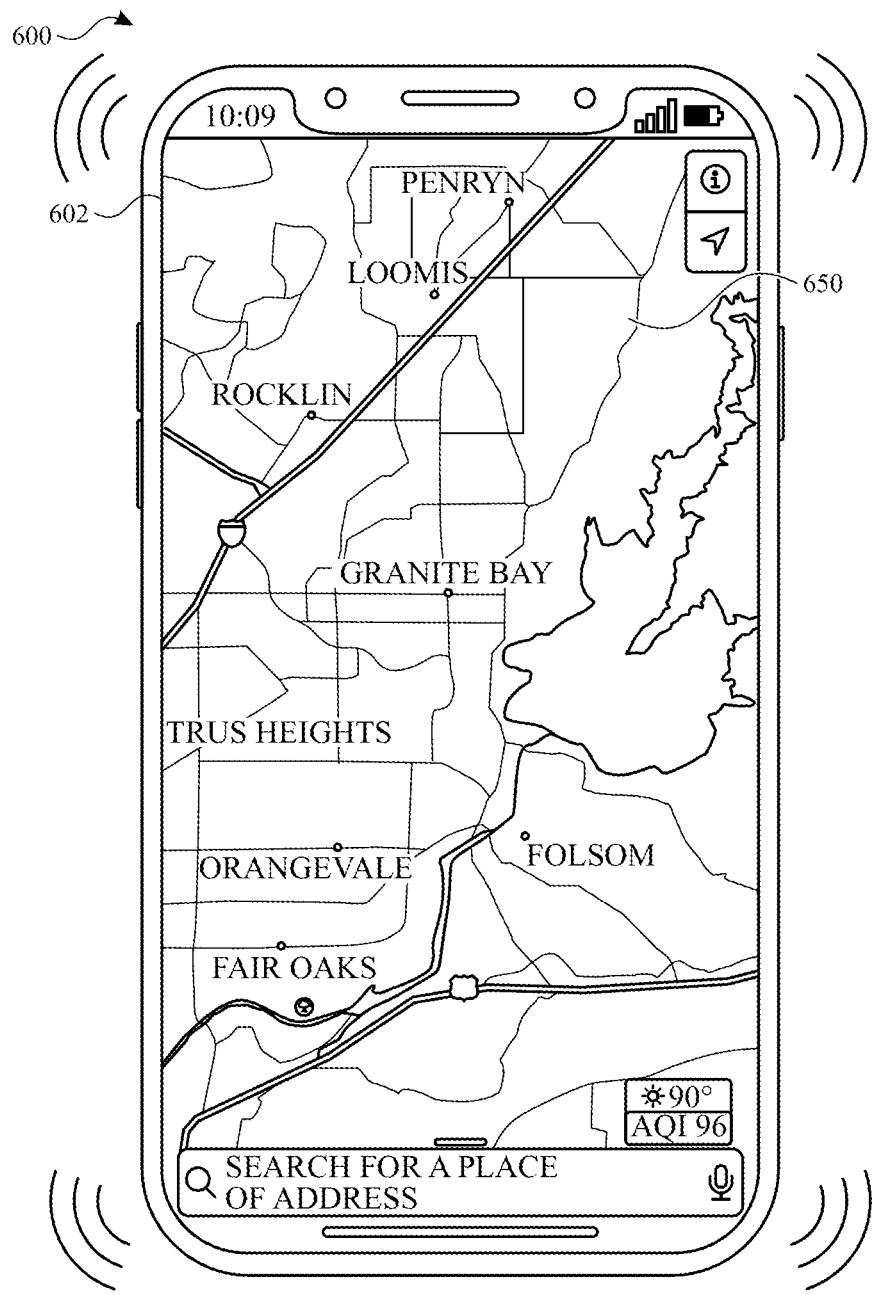

At FIG. 6Q, electronic device 600 has determined that the user input 654 is a fast double tap input. As was shown in FIG. 6L, the fast double tap input is assigned to the "undo" task. Accordingly, in response to user input 654, electronic device 600 performs the "undo" task, which, in the depicted embodiment, comprises undoing the last action taken by the user. In the depicted scenario, the last action taken by the user was to zoom in on user interface 650 (from FIG. 6M to FIG. 6N). Accordingly, in response to the determination that the user input 654 is a fast double tap input, electronic device 600 undoes the zoom in operation, and zooms back out on user interface 650 to return user interface 650 to the state that it was in in FIG. 6M. In response to user input 654, electronic device 600 also outputs a tactile output (e.g., a haptic output).

Figure 6R:
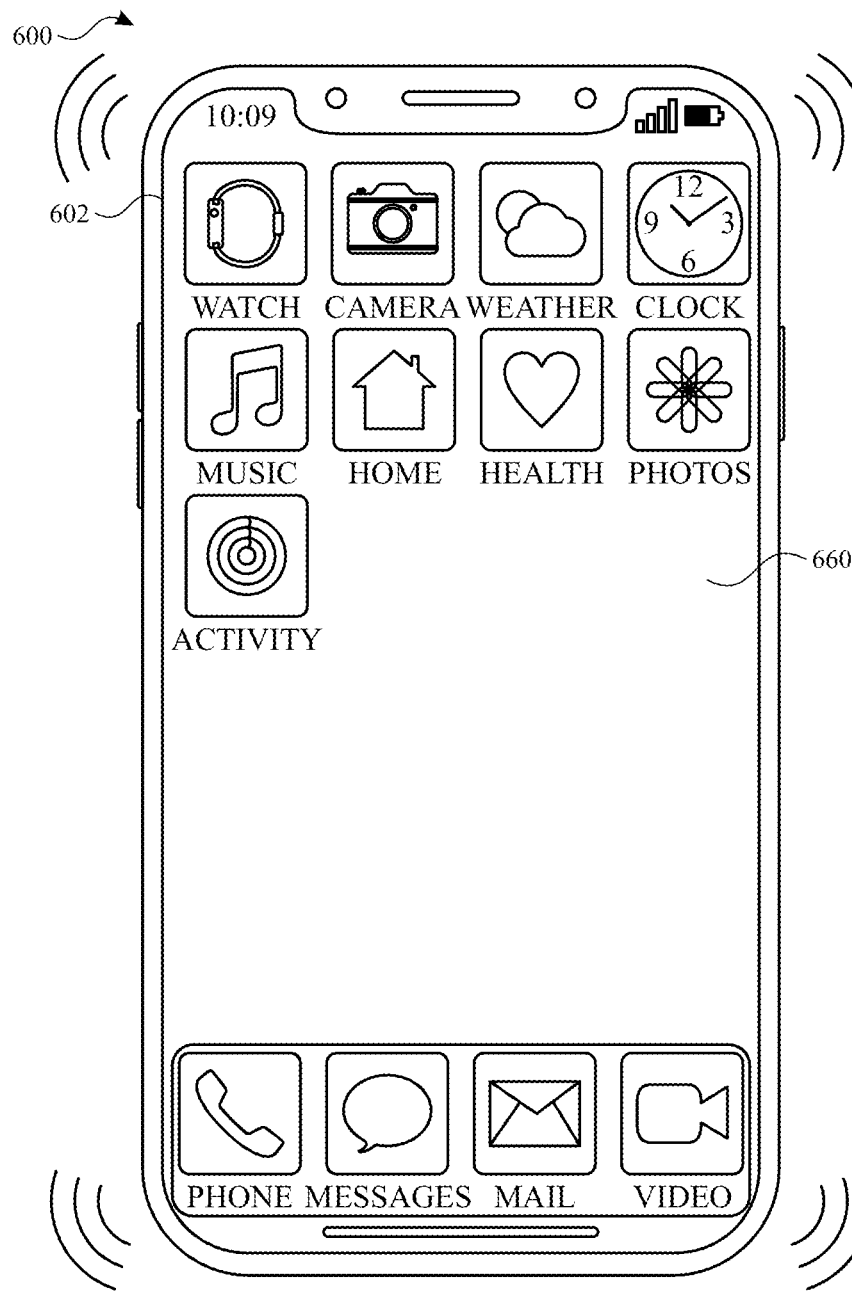
Figure 6S:
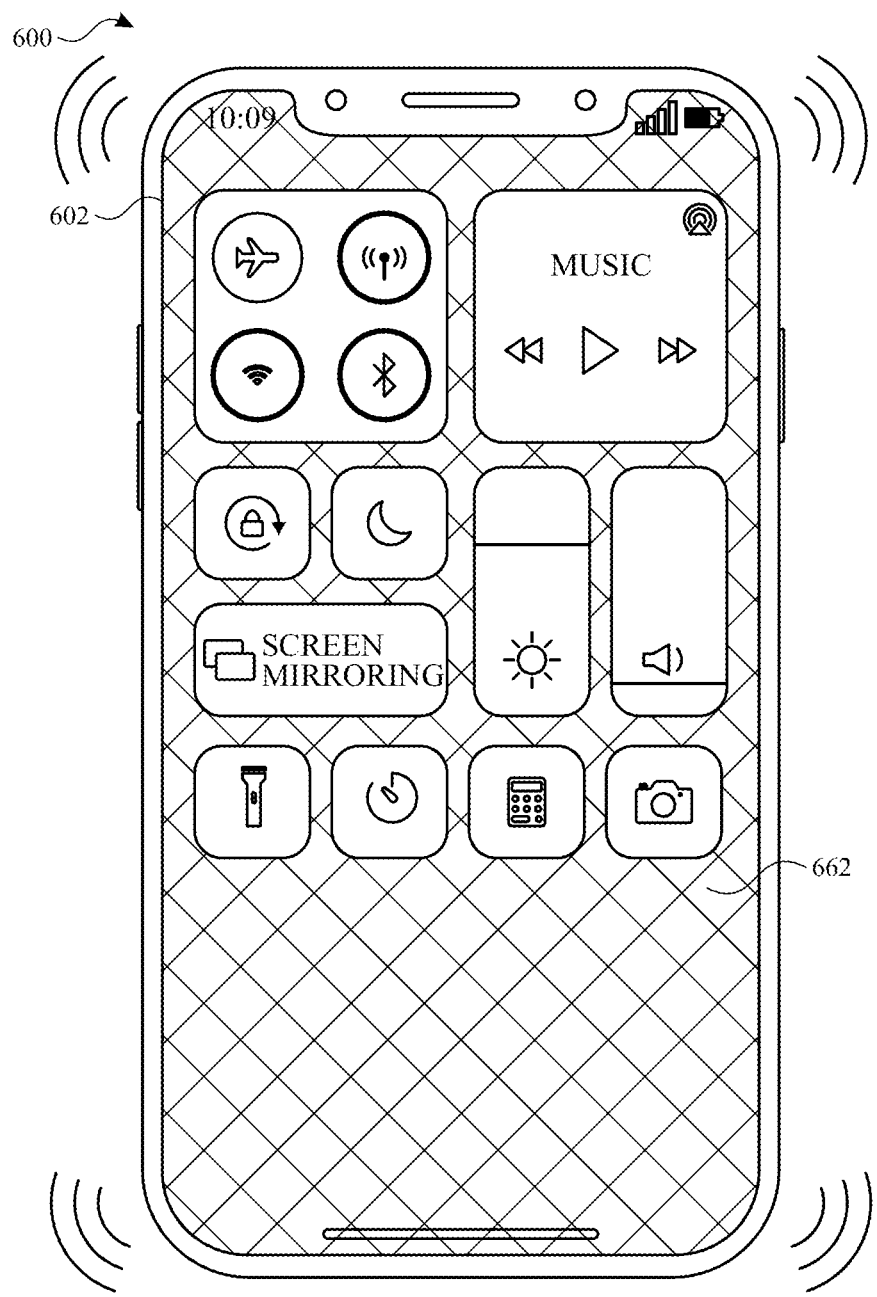
Figure 7A:
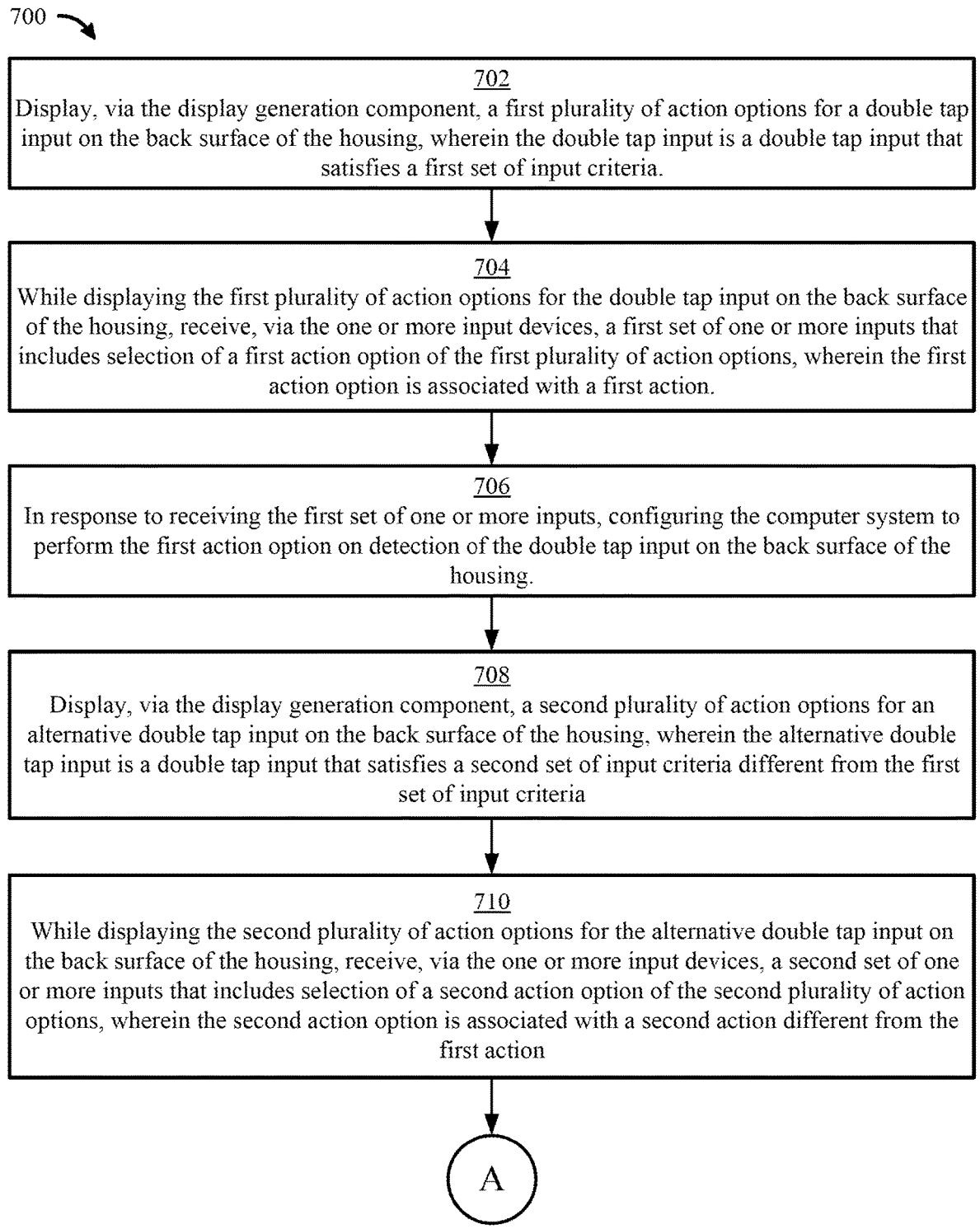
FIGS. 7A-7D are a flow diagram illustrating an exemplary process for assigning and responding to user inputs, in accordance with some embodiments.
Figure 7B:
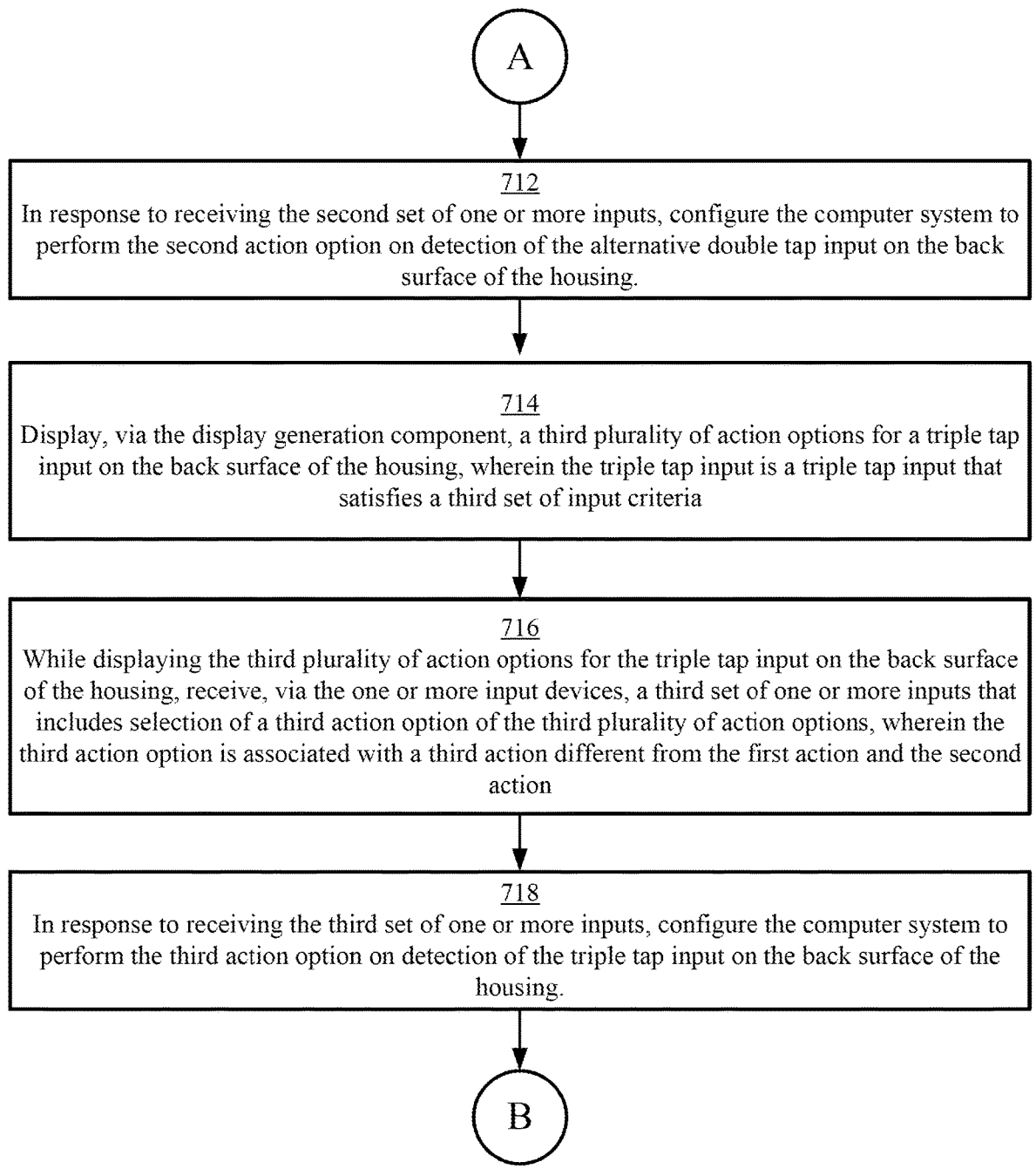
Figure 7C:
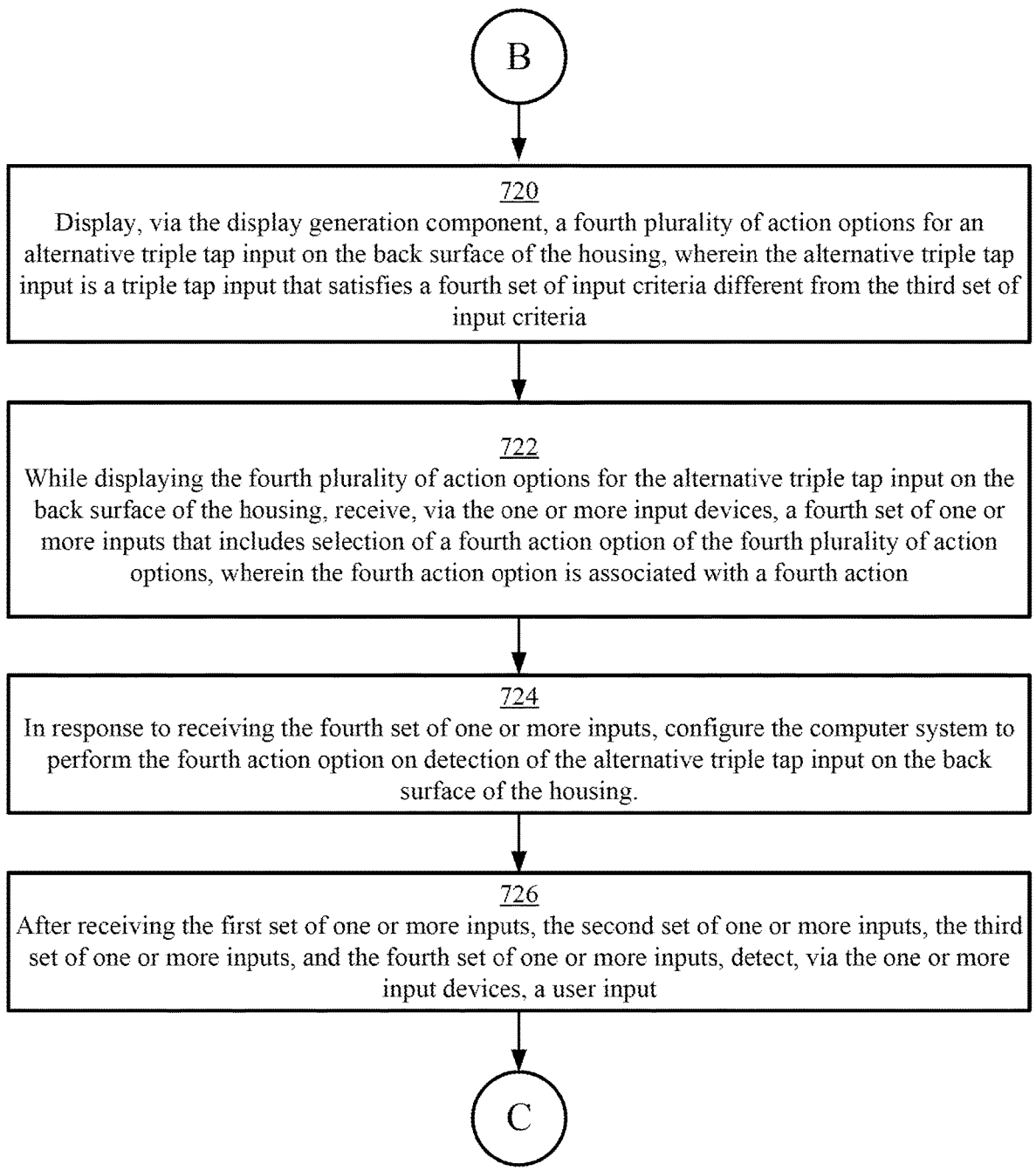
Figure 7D:
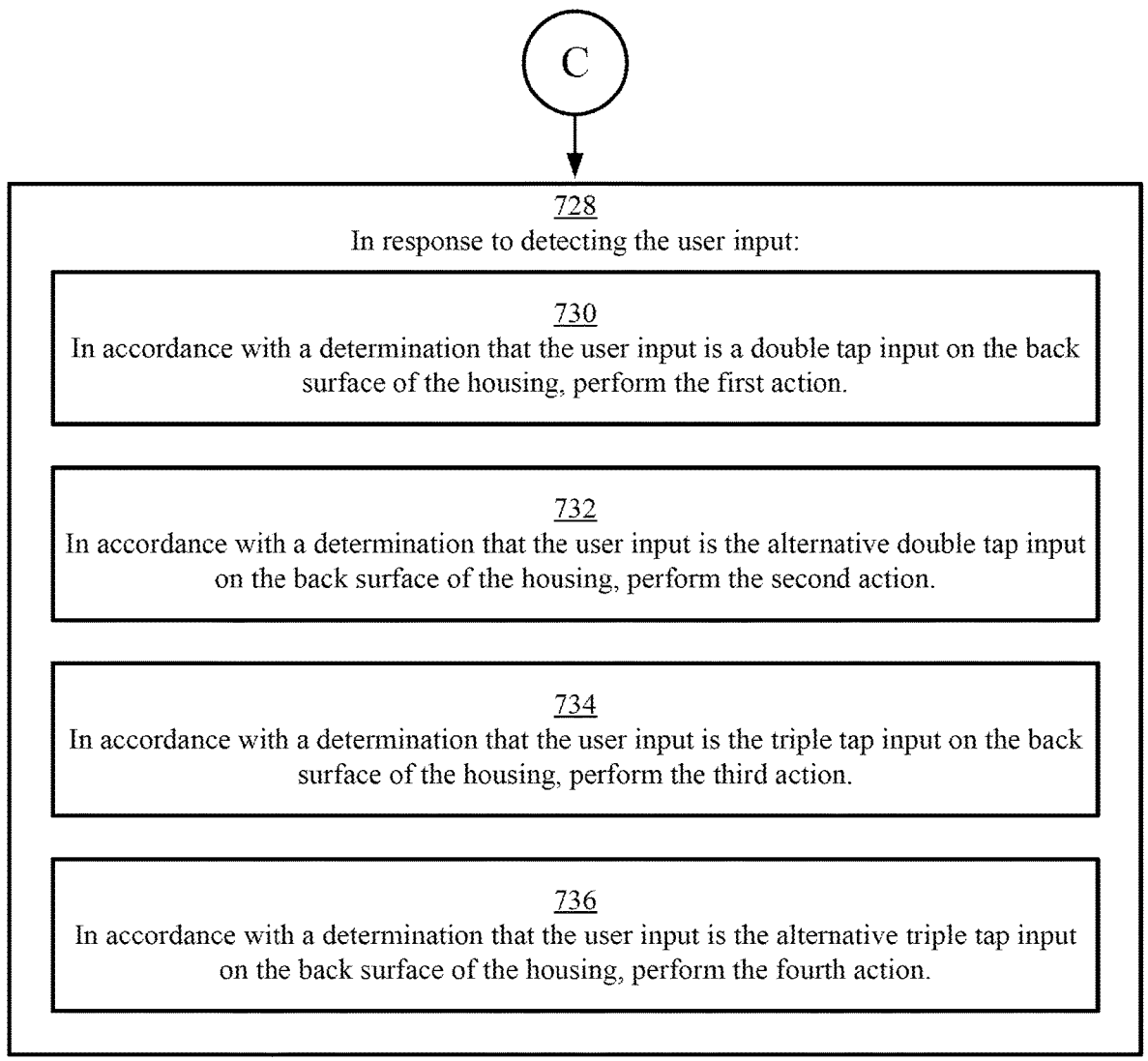

At FIG. 6R, electronic device 600 has determined that the user input 654 is a slow triple tap input. As was shown in FIG. 6L, the slow triple tap input is assigned to the "home" task. Accordingly, in response to user input 654, electronic device 600 performs the "home" task, which, in the depicted embodiment, comprises replacing display of the user interface 650 with a home user interface 660. In response to user input 654, electronic device 600 also outputs a tactile output (e.g., a haptic output).

At FIG. 6S, electronic device 600 has determined that the user input 654 is a fast triple tap input. As was shown in FIG. 6L, the fast triple tap input is assigned to the "control center" task. Accordingly, in response to user input 654, electronic device 600 performs the "control center" task, which, in the depicted embodiments, comprises overlaying and/or replacing display of the user interface 650 with a control center user interface 662. In response to user input 654, electronic device 600 also outputs a tactile output (e.g., a haptic output).

FIGS. 7A-7D are a flow diagram illustrating a method for assigning and responding to user inputs using an electronic device in accordance with some embodiments. Method 700 is performed at a computer system (e.g., 100, 300, 500) that is in communication with a display (e.g., a display generation component) and one or more input devices. Some operations in method 700 are, optionally, combined, the orders of some operations are, optionally, changed, and some operations are, optionally, omitted.

As described below, method 700 provides an intuitive way for assigning various tasks to various user inputs, and responding to detection of those user inputs. The method reduces the cognitive burden on a user for performing certain tasks on a device, thereby creating a more efficient human-machine interface. For battery-operated computing devices, enabling a user to assign custom tasks to various user inputs such that the user can perform those tasks faster and more efficiently conserves power and increases the time between battery charges.

In some embodiments, the computer system displays (702), via the display generation component, a first plurality of action options (e.g., 624a-624p) (e.g., a plurality of actions, a plurality of functions) for a double tap input (e.g., "double tap (slow)" of FIG. 6L) (e.g., two successive taps within a threshold period of time) on the back surface of the housing (in some embodiments, a double tap input on a rear portion of the computer system) (in some embodiments, a double tap input on a portion of the computer system outside the touch-sensitive surface (e.g., outside the touch-sensitive display)), wherein the double tap input is a double tap input that satisfies a first set of input criteria (e.g., amount of time between the inputs, overall duration between the first portion of the input and the final portion of the input) (e.g., a slow double tap input, or a fast double tap input).

While displaying the first plurality of action options (e.g., 624a-624p) for the double tap input on the back surface of the housing, the computer system receives (704), via the one or more input devices, a first set of one or more inputs (e.g., 627) that includes selection of a first action option (e.g., 624b) of the first plurality of action options, wherein the first action option is associated with a first action.

In response to receiving the first set of one or more inputs (e.g., 627), the computer system configures (706) the computer system to perform the first action option on detection of the double tap input on the back surface of the housing (e.g., modifying/changing what action is performed on detection of a double tap input on the back surface).

The computer system displays (708), via the display generation component, a second plurality of action options (e.g., 632) (e.g., a plurality of actions, a plurality of functions) (in some embodiments, the second plurality of action options is the same as the first plurality of action options) (in some embodiments, the second plurality of action options is different from the first plurality of action options) for an alternative double tap input (e.g., "double tap (fast)" of FIG. 6L) (e.g., two successive taps within a threshold period of time) (e.g., a fast double tap input, a slow double tap input) on the back surface of the housing (in some embodiments, a double tap input on a rear portion of the computer system) (in some embodiments, a double tap input on a portion of the computer system outside the touch-sensitive surface (e.g., outside the touch-sensitive display)), wherein the alternative double tap input is a double tap input that satisfies a second set of input criteria different from the first set of input criteria (e.g., amount of time between the inputs, overall duration between the first portion of the input and the final portion of the input) (e.g., fast double tap v. slow double tap).

While displaying the second plurality of action options (e.g., 632) for the alternative double tap input on the back surface of the housing, the computer system receives (710), via the one or more input devices, a second set of one or more inputs (e.g., 634) that includes selection of a second action option (e.g., "undo" option of FIG. 6G) of the second plurality of action options, wherein the second action option is associated with a second action different from the first action.

In response to receiving the second set of one or more inputs (e.g., 634), the computer system configures (712) the computer system to perform the second action option on detection of the alternative double tap input on the back surface of the housing (e.g., modifying/changing what action is performed on detection of a double tap input on the back surface).

The computer system displays (714), via the display generation component, a third plurality of action options (e.g., 642) (e.g., a plurality of actions, a plurality of functions) (in some embodiments, the third plurality of action options is the same as the first and/or second plurality of action options) (in some embodiments, the second plurality of action options is different from the first and/or second plurality of action options) for a triple tap input (e.g., "triple tap (slow)" of FIG. 6L) (e.g., three successive taps within a threshold period of time) on the back surface of the housing (in some embodiments, a triple tap input on a rear portion of the computer system) (in some embodiments, a triple tap input on a portion of the computer system outside the touch-sensitive surface (e.g., outside the touch-sensitive display)), wherein the triple tap input is a triple tap input that satisfies a third set of input criteria (e.g., amount of time between the inputs, overall duration between the first portion of the input and the final portion of the input) (e.g., slow triple tap or fast triple tap).

While displaying the third plurality of action options (e.g., 642) for the triple tap input on the back surface of the housing, the computer system receives (716), via the one or more input devices, a third set of one or more inputs (e.g., 644) that includes selection of a third action option (e.g., "home" option of FIG. 6J) of the third plurality of action options, wherein the third action option is associated with a third action different from the first action and the second action.

In response to receiving the third set of one or more inputs, the computer system configures (718) the computer system to perform the third action option on detection of the triple tap input on the back surface of the housing (e.g., modifying/changing what action is performed on detection of a triple tap input on the back surface).

The computer system displays (720), via the display generation component, a fourth plurality of action options (e.g., 622, 632, 642) (e.g., a plurality of actions, a plurality of functions) for an alternative triple tap input (e.g., "triple tap (fast)" in FIG. 6L) (e.g., three successive taps within a threshold period of time) (e.g., a fast triple tap input, a slow triple tap input) on the back surface of the housing (in some embodiments, a triple tap input on a rear portion of the computer system) (in some embodiments, a triple tap input on a portion of the computer system outside the touch-sensitive surface (e.g., outside the touch-sensitive display)), wherein the alternative triple tap input is a triple tap input that satisfies a fourth set of input criteria different from the third set of input criteria (e.g., amount of time between the inputs, overall duration between the first portion of the input and the final portion of the input) (e.g., fast triple tap v. slow triple tap).

While displaying the fourth plurality of action options for the alternative triple tap input on the back surface of the housing, the computer system receives (722), via the one or more input devices, a fourth set of one or more inputs that includes selection of a fourth action option of the fourth plurality of action options (e.g., "control center" in FIG. 6L), wherein the fourth action option is associated with a fourth action.

In response to receiving the fourth set of one or more inputs, the computer system configures (724) the computer system to perform the fourth action option on detection of the alternative triple tap input on the back surface of the housing (e.g., modifying/changing what action is performed on detection of a double tap input on the back surface).

After receiving the first set of one or more inputs, the second set of one or more inputs, the third set of one or more inputs, and the fourth set of one or more inputs, the computer system detects (726), via the one or more input devices, a user input (e.g., 654) (e.g., a user input on a portion of the computer system outside the touch-sensitive surface (e.g., outside the touch-sensitive display)).

In response to detecting the user input (728), and in accordance with a determination that the user input is a double tap input on the back surface of the housing, the computer system performs (730) the first action (e.g., FIG. 6P) (e.g., without performing the second, third, or fourth actions).

In response to detecting the user input (728), and in accordance with a determination that the user input is the alternative double tap input on the back surface of the housing, the computer system performs (732) the second action (e.g., FIG. 6Q) (e.g., without performing the first, third, or fourth actions).

In response to detecting the user input (728), and in accordance with a determination that the user input is a triple tap input on the back surface of the housing, the computer system performs (734) the third action (e.g., FIG. 6R) (e.g., without performing the first, second, or third actions).

In response to detecting the user input (728), and in accordance with a determination that the user input is the alternative triple tap input on the back surface of the housing, the computer system performs (736) the fourth action (e.g., FIG. 6S) (e.g., without performing the first, second, or third actions). In some embodiments, the user input is detected based on accelerometer data. In some embodiments, the determination that the user input is a double tap input on the back surface of the housing and/or the determination that the user input is a triple tap input on the back surface of the housing is made based on a machine learning model (e.g., a machine learning model configured to received accelerometer data). Performing a particular action in response to receiving a double tap input, an alternative double tap input, a triple tap input, or an alternative triple tap input on the back surface of the housing provides the user with the capability to perform these operations without requiring further inputs. Performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first action option (in some embodiments, the second action option, the third action option, the fourth action option) corresponds to a first type of action (e.g., actions that are grouped together and configurable via shared menu interface (e.g., 656) (e.g., actions related to accessibility accommodations)) and wherein performing the first action (in some embodiments, performing the second/third/fourth action, when the second/third/fourth option corresponds to the first type of action) includes: in accordance with a determination that only one action (e.g., a zoom function for users that have difficulty perceiving smaller objects) of a plurality of user-configurable actions of the first type is currently enabled, the computer system performs the only one action; and in accordance with a determination that more than one action of the plurality of user configurable actions (e.g., actions that can be enabled or disabled by the user (e.g., via a settings menu)) of the first type are currently enabled (e.g., FIG. 6D1), the computer system displays, via the display generation component, a set of selectable user interface objects (e.g., 658a, 658b) (e.g., an option menu for actions of the first type (e.g., an accessibility shortcut menu)) corresponding to enabled actions of the first type that includes (e.g., includes at least): a first selectable user interface object (e.g., 658a) that corresponds to a first enabled user configurable action (e.g., a zoom function for users that have difficulty perceiving smaller objects) of the first type that, when selected, causes the computer system to perform the first enabled user configurable action of the first type; and a second user interface object (e.g., 658*b*) that corresponds to a second enabled user configurable action (e.g., a color filter option for users with color blindness) of the first type, different from the first enabled user configurable action of the first type, that, when selected, causes the computer system to perform the second enabled user configurable action of the first type.

In some embodiments, while displaying the set of selectable user interface objects corresponding to enabled actions of the first type, the computer system receives, via the one or more input devices, a second user input; and in response to receiving the second user input: in accordance with a determination the second user input corresponds to the a first selectable user interface object, the computer system performs the first enabled user configurable action of the first type; and in accordance with a determination the second user input corresponds to the a second selectable user interface object, the computer system performs the second enabled user configurable action of the first type (e.g., without performing the first enabled user configurable action of the first type). Performing the one action or displaying a set of selectable user interface objects in response to receiving a double tap input on the back surface of the housing provides the user with the capability to perform these operations without requiring further inputs. Performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, performing the first action or performing the second action (in some embodiments, performing the third action or performing the fourth action) includes displaying, via the display generation component, a user interface selected from the group consisting of: a home screen user interface (e.g., 660), a notification center user interface (e.g., 624*h*), and a control center user interface (e.g., 662). In some embodiments, displaying the user interface of the first action includes replacing a currently displayed user interface. In some embodiments, the home screen user interface comprises a plurality of application icons that are selectable by a user to open one or more applications. In some embodiments, the notification center user interface comprises one or more notifications pertaining to one or more applications. In some embodiments, the control center user interface comprises one or more selectable objects for controlling one or more functions of the computer system (e.g., wifi on/off, Bluetooth on/off, flashlight on/off, display brightness, volume, display orientation lock, airplane mode). Displaying a home screen user interface, a notification center user interface, and/or a control center user interface in response to receiving a double tap input or a triple tap input on the back surface of the housing provides the user with the capability to perform these operations without requiring further inputs. Performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, performing the first action or performing the second action (in some embodiments, performing the third action or performing the fourth action) includes placing the computer system into a locked state (e.g., 624*f*). Placing the computer system into a locked state in response to receiving a double tap input or a triple tap input on the back surface of the housing provides the user with the capability to perform these operations without requiring further inputs. Performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, performing the first action or performing the second action (in some embodiments, performing the third action or performing the fourth action) includes initiating a process to place the computer system into an unlocked state (e.g., 624*f*) (e.g., the first action, the second action, the third action, and/or the fourth action comprises displaying a user interface for entering a passcode to unlock the computer system; the first action, the second action, the third action, and/or the fourth action comprises initiating one or more biometric authentication processes to unlock the computer system). Initiating a process to place the computer system into an unlocked state in response to receiving a double tap input or a triple tap input on the back surface of the housing provides the user with the capability to perform these operations without requiring further inputs. Performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, performing the first action or performing the second action (in some embodiments, performing the third action or performing the fourth action) includes translating one or more items presented on the display generation component (e.g., 624*l*) (e.g., translating from a first language to a second language). Translating one or more items presented on the display generation component in response to receiving a double tap input or a triple tap input on the back surface of the housing provides the user with the capability to perform these operations without requiring further inputs. Performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, prior to detecting the first user input, the computer system detects a third user input (e.g., 652) on a front surface (e.g., 602) (e.g., a surface that includes the display generation component (e.g., a touch-sensitive display; a surface substantially opposite the back surface)) of the housing, and in response to detecting the third user input on the front surface of the housing, the computer system performs an action (e.g., a zoom-in action) associated with the third user input on the front surface of the housing (e.g., FIGS. 6M-6N), wherein performing the first action or performing the second action (in some embodiments, performing the third action or performing the fourth action) includes undoing (e.g., reversing (e.g., zooming back to the same level of zoom that was being displayed prior to performance of a zoom-in action)) the action associated with the third user input on the front surface of the housing (e.g., FIG. 6Q). Undoing an action in response to receiving a double tap input or a triple tap input on the back surface of the housing provides the user with the capability to perform these operations without requiring further inputs. Performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, performing the first action or performing the second action includes generating tactile output (e.g., FIGS. 6P, 6Q, 6R, 6S). In some embodiments, in accordance with a determination that the user input is a double tap input, the computer system outputs first haptic feedback indicating that a double tap input has been detected, and in accordance with a determination that the user input is a triple tap input, the computer system outputs second haptic feedback, different from the first haptic feedback, indicating that a triple tap input has been detected. Generating tactile output provides the user with feedback about the current state of the device (e.g., a double tap or triple tap input has been detected on the back surface of the housing). Providing improved feedback to the user enhances the operability of the device and makes the user-device interface more efficient (e.g., by helping the user to provide proper inputs and reducing user mistakes when operating/ interacting with the device) which, additionally, reduces power usage and improves battery life of the device by enabling the user to use the device more quickly and efficiently.

In some embodiments, a determination is made as to a location and/or position on the back surface of the housing on which the user input was received (e.g., top, bottom, left, right) and performing the first action, second action, third action, and/or fourth action is performed based on the location and/or position on the back surface of the housing on which the user input was received. In various embodiments, the first action, second action, third action, and/or fourth action can include one or more of the following: scrolling displayed content, taking an action within a game (e.g., turning and/or moving an avatar within a game), setting position information for an external display (e.g., double tap on left side of computer system to indicate to a computer system that the external display is to the left of the computer system), combining multiple display devices together to form a larger screen (e.g., tapping individual display devices to indicate the position of the display device relative to other display devices), double or triple tap to tell time (e.g., device speaks time), double tap or triple tap to turn off alarm, double tap or triple tap to turn off phone ring, double tap or triple tap to send emergency message, double tap or triple tap to reveal a dock user interface, double tap or triple tap to turn a page in a document (e.g., left tap to go back a page, right tap to go forward a page), double tap or triple tap to open a camera application, double tap or triple tap to navigate within audio and/or video content (e.g., tap on left to go back ten seconds, tap on right to go forward ten seconds), double tap or triple tap to adjust playback speed (e.g., tap on left to slow down playback speed, tap on right to speed up playback speed), double tap or triple tap to enable or disable split view, double tap or triple tap to change device display orientation (e.g., transition between portrait and/or landscape view), double tap or triple tap to enable or disable a hardware component (e.g., a camera, a microphone), double tap or triple tap to initiate a virtual assistant in different language (e.g., slow double tap to initiate virtual assistant in a first language, fast double tap to initiate virtual assistant in a second language different from the first language, slow triple tap to initiate virtual assistant in a third language different from the first and second languages, etc.).

Note that details of the processes described above with respect to method 700 (e.g., FIGS. 7A-D) are also applicable in an analogous manner to other methods described herein. For brevity, these details are not repeated.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve assignment of various user inputs to various tasks and detection of those user inputs. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to assign customized tasks to various user inputs. Accordingly, use of such personal information data enables users to have control of various user inputs and how those inputs are detected, and the response to those inputs. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

What is claimed is:

1. A computer system comprising:
   a housing having a back surface;
   a display generation component;
   one or more input devices;
   one or more processors; and
   memory storing one or more programs configured to be executed by the one or more processors, the one or more programs including instructions for:
   displaying, via the display generation component, a first plurality of action options for a double tap input on the back surface of the housing, wherein the double tap input is a double tap input that satisfies a first set of input criteria;
   while displaying the first plurality of action options for the double tap input on the back surface of the housing, receiving, via the one or more input devices, a first set of one or more inputs that includes selection of a first action option of the first plurality of action options, wherein the first action option is associated with a first action;
   in response to receiving the first set of one or more inputs, configuring the computer system to perform the first action on detection of the double tap input on the back surface of the housing;
   displaying, via the display generation component, a second plurality of action options for an alternative double tap input on the back surface of the housing, wherein the alternative double tap input is a double tap input that satisfies a second set of input criteria different from the first set of input criteria;
   while displaying the second plurality of action options for the alternative double tap input on the back surface of the housing, receiving, via the one or more input devices, a second set of one or more inputs that includes selection of a second action option of the second plurality of action options, wherein the second action option is associated with a second action different from the first action;
   in response to receiving the second set of one or more inputs, configuring the computer system to perform the second action on detection of the alternative double tap input on the back surface of the housing;
   displaying, via the display generation component, a third plurality of action options for a triple tap input on the back surface of the housing, wherein the triple tap input is a triple tap input that satisfies a third set of input criteria;
   while displaying the third plurality of action options for the triple tap input on the back surface of the housing, receiving, via the one or more input devices, a third set of one or more inputs that includes selection of a third action option of the third plurality of action options, wherein the third action option is associated with a third action different from the first action and the second action;

in response to receiving the third set of one or more inputs, configuring the computer system to perform the third action on detection of the triple tap input on the back surface of the housing;

displaying, via the display generation component, a fourth plurality of action options for an alternative triple tap input on the back surface of the housing, wherein the alternative triple tap input is a triple tap input that satisfies a fourth set of input criteria different from the third set of input criteria;

while displaying the fourth plurality of action options for the alternative triple tap input on the back surface of the housing, receiving, via the one or more input devices, a fourth set of one or more inputs that includes selection of a fourth action option of the fourth plurality of action options, wherein the fourth action option is associated with a fourth action;

in response to receiving the fourth set of one or more inputs, configuring the computer system to perform the fourth action on detection of the alternative triple tap input on the back surface of the housing;

after receiving the first set of one or more inputs, the second set of one or more inputs, the third set of one or more inputs, and the fourth set of one or more inputs, detecting, via the one or more input devices, a user input; and in response to detecting the user input:
  in accordance with a determination that the user input is the double tap input on the back surface of the housing, performing the first action;
  in accordance with a determination that the user input is the alternative double tap input on the back surface of the housing, performing the second action;
  in accordance with a determination that the user input is the triple tap input on the back surface of the housing, performing the third action; and
  in accordance with a determination that the user input is the alternative triple tap input on the back surface of the housing, performing the fourth action.

2. The computer system of claim 1, wherein the first action option corresponds to a first type of action and wherein performing the first action includes:
  in accordance with a determination that only one action of a plurality of user-configurable actions of the first type is currently enabled, performing the only one action; and
  in accordance with a determination that more than one action of the plurality of user configurable actions of the first type are currently enabled, displaying, via the display generation component, a set of selectable user interface objects corresponding to enabled actions of the first type that includes:
    a first selectable user interface object that corresponds to a first enabled user configurable action of the first type that, when selected, causes the computer system to perform the first enabled user configurable action of the first type; and
    a second user interface object that corresponds to a second enabled user configurable action of the first type, different from the first enabled user configurable action of the first type, that, when selected, causes the computer system to perform the second enabled user configurable action of the first type.

3. The computer system of claim 1, wherein performing the first action or performing the second action includes displaying, via the display generation component, a user interface selected from the group consisting of:
  a home screen user interface,
  a notification center user interface, and
  a control center user interface.

4. The computer system of claim 1, wherein performing the first action or performing the second action includes placing the computer system into a locked state.

5. The computer system of claim 1, wherein performing the first action or performing the second action includes initiating a process to place the computer system into an unlocked state.

6. The computer system of claim 1, wherein performing the first action or performing the second action includes translating one or more items presented on the display generation component.

7. The computer system of claim 1, wherein the one or more programs further include instructions for:
  prior to detecting the first user input, detecting a third user input on a front surface of the housing, and
  in response to detecting the third user input on the front surface of the housing, performing an action associated with the third user input on the front surface of the housing, wherein:
  performing the first action or performing the second action includes undoing the action associated with the third user input on the front surface of the housing.

8. The computer system of claim 1, wherein performing the first action or performing the second action includes generating tactile output.

9. A non-transitory computer-readable storage medium storing one or more programs configured to be executed by one or more processors of a computer system that is in communication with a display generation component and one or more input devices, wherein the computer system includes a housing having a back surface, the one or more programs including instructions for:
  displaying, via the display generation component, a first plurality of action options for a double tap input on the back surface of the housing, wherein the double tap input is a double tap input that satisfies a first set of input criteria;
  while displaying the first plurality of action options for the double tap input on the back surface of the housing, receiving, via the one or more input devices, a first set of one or more inputs that includes selection of a first action option of the first plurality of action options, wherein the first action option is associated with a first action;
  in response to receiving the first set of one or more inputs, configuring the computer system to perform the first action on detection of the double tap input on the back surface of the housing;
  displaying, via the display generation component, a second plurality of action options for an alternative double tap input on the back surface of the housing, wherein the alternative double tap input is a double tap input that satisfies a second set of input criteria different from the first set of input criteria;
  while displaying the second plurality of action options for the alternative double tap input on the back surface of the housing, receiving, via the one or more input devices, a second set of one or more inputs that includes selection of a second action option of the second plurality of action options, wherein the second action option is associated with a second action different from the first action;

in response to receiving the second set of one or more inputs, configuring the computer system to perform the second action on detection of the alternative double tap input on the back surface of the housing;

displaying, via the display generation component, a third plurality of action options for a triple tap input on the back surface of the housing, wherein the triple tap input is a triple tap input that satisfies a third set of input criteria;

while displaying the third plurality of action options for the triple tap input on the back surface of the housing, receiving, via the one or more input devices, a third set of one or more inputs that includes selection of a third action option of the third plurality of action options, wherein the third action option is associated with a third action different from the first action and the second action;

in response to receiving the third set of one or more inputs, configuring the computer system to perform the third action on detection of the triple tap input on the back surface of the housing;

displaying, via the display generation component, a fourth plurality of action options for an alternative triple tap input on the back surface of the housing, wherein the alternative triple tap input is a triple tap input that satisfies a fourth set of input criteria different from the third set of input criteria;

while displaying the fourth plurality of action options for the alternative triple tap input on the back surface of the housing, receiving, via the one or more input devices, a fourth set of one or more inputs that includes selection of a fourth action option of the fourth plurality of action options, wherein the fourth action option is associated with a fourth action;

in response to receiving the fourth set of one or more inputs, configuring the computer system to perform the fourth action on detection of the alternative triple tap input on the back surface of the housing;

after receiving the first set of one or more inputs, the second set of one or more inputs, the third set of one or more inputs, and the fourth set of one or more inputs, detecting, via the one or more input devices, a user input; and in response to detecting the user input:
  in accordance with a determination that the user input is the double tap input on the back surface of the housing, performing the first action;
  in accordance with a determination that the user input is the alternative double tap input on the back surface of the housing, performing the second action;
  in accordance with a determination that the user input is the triple tap input on the back surface of the housing, performing the third action; and
  in accordance with a determination that the user input is the alternative triple tap input on the back surface of the housing, performing the fourth action.

10. A method, comprising:

at a computer system that is in communication with a display generation component and one or more input devices, wherein the computer system includes a housing having a back surface:

displaying, via the display generation component, a first plurality of action options for a double tap input on the back surface of the housing, wherein the double tap input is a double tap input that satisfies a first set of input criteria;

while displaying the first plurality of action options for the double tap input on the back surface of the housing, receiving, via the one or more input devices, a first set of one or more inputs that includes selection of a first action option of the first plurality of action options, wherein the first action option is associated with a first action;

in response to receiving the first set of one or more inputs, configuring the computer system to perform the first action on detection of the double tap input on the back surface of the housing;

displaying, via the display generation component, a second plurality of action options for an alternative double tap input on the back surface of the housing, wherein the alternative double tap input is a double tap input that satisfies a second set of input criteria different from the first set of input criteria;

while displaying the second plurality of action options for the alternative double tap input on the back surface of the housing, receiving, via the one or more input devices, a second set of one or more inputs that includes selection of a second action option of the second plurality of action options, wherein the second action option is associated with a second action different from the first action;

in response to receiving the second set of one or more inputs, configuring the computer system to perform the second action on detection of the alternative double tap input on the back surface of the housing;

displaying, via the display generation component, a third plurality of action options for a triple tap input on the back surface of the housing, wherein the triple tap input is a triple tap input that satisfies a third set of input criteria;

while displaying the third plurality of action options for the triple tap input on the back surface of the housing, receiving, via the one or more input devices, a third set of one or more inputs that includes selection of a third action option of the third plurality of action options, wherein the third action option is associated with a third action different from the first action and the second action;

in response to receiving the third set of one or more inputs, configuring the computer system to perform the third action on detection of the triple tap input on the back surface of the housing;

displaying, via the display generation component, a fourth plurality of action options for an alternative triple tap input on the back surface of the housing, wherein the alternative triple tap input is a triple tap input that satisfies a fourth set of input criteria different from the third set of input criteria;

while displaying the fourth plurality of action options for the alternative triple tap input on the back surface of the housing, receiving, via the one or more input devices, a fourth set of one or more inputs that includes selection of a fourth action option of the fourth plurality of action options, wherein the fourth action option is associated with a fourth action;

in response to receiving the fourth set of one or more inputs, configuring the computer system to perform the fourth action on detection of the alternative triple tap input on the back surface of the housing;

after receiving the first set of one or more inputs, the second set of one or more inputs, the third set of one or more inputs, and the fourth set of one or more inputs, detecting, via the one or more input devices, a user input; and in response to detecting the user input:
in accordance with a determination that the user input is the double tap input on the back surface of the housing, performing the first action;
in accordance with a determination that the user input is the alternative double tap input on the back surface of the housing, performing the second action;
in accordance with a determination that the user input is the triple tap input on the back surface of the housing, performing the third action; and
in accordance with a determination that the user input is the alternative triple tap input on the back surface of the housing, performing the fourth action.

11. The non-transitory computer-readable storage medium of claim 9, wherein the first action option corresponds to a first type of action and wherein performing the first action includes:
in accordance with a determination that only one action of a plurality of user-configurable actions of the first type is currently enabled, performing the only one action; and
in accordance with a determination that more than one action of the plurality of user configurable actions of the first type are currently enabled, displaying, via the display generation component, a set of selectable user interface objects corresponding to enabled actions of the first type that includes:
a first selectable user interface object that corresponds to a first enabled user configurable action of the first type that, when selected, causes the computer system to perform the first enabled user configurable action of the first type; and
a second user interface object that corresponds to a second enabled user configurable action of the first type, different from the first enabled user configurable action of the first type, that, when selected, causes the computer system to perform the second enabled user configurable action of the first type.

12. The non-transitory computer-readable storage medium of claim 9, wherein performing the first action or performing the second action includes displaying, via the display generation component, a user interface selected from the group consisting of:
a home screen user interface,
a notification center user interface, and
a control center user interface.

13. The non-transitory computer-readable storage medium of claim 9, wherein performing the first action or performing the second action includes placing the computer system into a locked state.

14. The non-transitory computer-readable storage medium of claim 9, wherein performing the first action or performing the second action includes initiating a process to place the computer system into an unlocked state.

15. The non-transitory computer-readable storage medium of claim 9, wherein performing the first action or performing the second action includes translating one or more items presented on the display generation component.

16. The non-transitory computer-readable storage medium of claim 9, wherein the one or more programs further include instructions for:

prior to detecting the first user input, detecting a third user input on a front surface of the housing, and
in response to detecting the third user input on the front surface of the housing, performing an action associated with the third user input on the front surface of the housing, wherein:
performing the first action or performing the second action includes undoing the action associated with the third user input on the front surface of the housing.

17. The non-transitory computer-readable storage medium of claim 9, wherein performing the first action or performing the second action includes generating tactile output.

18. The method of claim 10, wherein the first action option corresponds to a first type of action and wherein performing the first action includes:
in accordance with a determination that only one action of a plurality of user-configurable actions of the first type is currently enabled, performing the only one action; and
in accordance with a determination that more than one action of the plurality of user configurable actions of the first type are currently enabled, displaying, via the display generation component, a set of selectable user interface objects corresponding to enabled actions of the first type that includes:
a first selectable user interface object that corresponds to a first enabled user configurable action of the first type that, when selected, causes the computer system to perform the first enabled user configurable action of the first type; and
a second user interface object that corresponds to a second enabled user configurable action of the first type, different from the first enabled user configurable action of the first type, that, when selected, causes the computer system to perform the second enabled user configurable action of the first type.

19. The method of claim 10, wherein performing the first action or performing the second action includes displaying, via the display generation component, a user interface selected from the group consisting of:
a home screen user interface,
a notification center user interface, and
a control center user interface.

20. The method of claim 10, wherein performing the first action or performing the second action includes placing the computer system into a locked state.

21. The method of claim 10, wherein performing the first action or performing the second action includes initiating a process to place the computer system into an unlocked state.

22. The method of claim 10, wherein performing the first action or performing the second action includes translating one or more items presented on the display generation component.

23. The method of claim 10, further comprising:
prior to detecting the first user input, detecting a third user input on a front surface of the housing, and
in response to detecting the third user input on the front surface of the housing, performing an action associated with the third user input on the front surface of the housing, wherein:
performing the first action or performing the second action includes undoing the action associated with the third user input on the front surface of the housing.

24. The method of claim 10, wherein performing the first action or performing the second action includes generating tactile output.

\* \* \* \* \*

UNITED STATES PATENT AND TRADEMARK OFFICE
CERTIFICATE OF CORRECTION

PATENT NO. : 11,416,136 B2
APPLICATION NO. : 17/167896
DATED : August 16, 2022
INVENTOR(S) : John M. Nefulda et al.

It is certified that error appears in the above-identified patent and that said Letters Patent is hereby corrected as shown below:

In the Specification

At Column 8, Lines 25-27, delete "and responding to user inputs and responding to user inputs" and insert -- and responding to user inputs --, therefor.

At Column 41, Line 22, delete "in in" and insert -- in --, therefor.

In the Claims

In Claim 7, at Column 52, Line 19, delete "first".

Signed and Sealed this
Sixth Day of December, 2022

Katherine Kelly Vidal
*Director of the United States Patent and Trademark Office*